US011329304B2

(12) United States Patent
Helms et al.

(10) Patent No.: US 11,329,304 B2
(45) Date of Patent: May 10, 2022

(54) REDOX-FLOW BATTERIES EMPLOYING OLIGOMERIC ORGANIC ACTIVE MATERIALS AND SIZE-SELECTIVE MICROPOROUS POLYMER MEMBRANES

(71) Applicant: The Regents of the University of California, Oakland, CA (US)

(72) Inventors: Brett A. Helms, San Francisco, CA (US); Sean E. Doris, San Francisco, CA (US); Ashleigh L. Ward, Berkeley, CA (US); Peter D. Frischmann, Berkeley, CA (US); Etienne Chenard, Urbanna, IL (US); Nagarjuna Gavvalapalli, Urbanna, IL (US); Jeffrey S. Moore, Savoy, IL (US)

(73) Assignees: The Regents of the University of California, Oakland, CA (US); The Board of Trustees of the University of Illinois, Urbana, IL (US)

(*) Notice: Subject to any disclaimer, the term of this patent is extended or adjusted under 35 U.S.C. 154(b) by 0 days.

(21) Appl. No.: 15/606,961

(22) Filed: May 26, 2017

(65) Prior Publication Data

US 2017/0346104 A1 Nov. 30, 2017

Related U.S. Application Data

(60) Provisional application No. 62/342,764, filed on May 27, 2016.

(51) Int. Cl.
*H01M 8/0239* (2016.01)
*H01M 8/18* (2006.01)

(52) U.S. Cl.
CPC ............ *H01M 8/188* (2013.01); *Y02E 60/50* (2013.01)

(58) Field of Classification Search
CPC ...................................................... H01M 8/188
(Continued)

(56) References Cited

U.S. PATENT DOCUMENTS

2012/0264589 A1* 10/2012 Du ..................... C08G 65/4006
502/4
2013/0280611 A1* 10/2013 Alkordi ................ H01M 50/411
429/224

(Continued)

OTHER PUBLICATIONS

Ansari et al., Hierarchical wood cellulose fiber/epoxy biocomposites—Matierals design of fiber porosity and nanostructure, Compoistes: Part A, vol./Issue 74, pp. 60-68 (Year: 2015).*

(Continued)

*Primary Examiner* — Jayne L Mershon
(74) *Attorney, Agent, or Firm* — Robin C. Chiang; Lawrence Berkeley; National Laboratory

(57) ABSTRACT

Intermittent energy sources, including solar and wind, require scalable, low-cost, multi-hour energy storage solutions to be effectively incorporated into the grid. Redox-flow batteries offer a solution, but suffer from rapid capacity fade and low Coulombic efficiency due to the high permeability of redox-active species across the battery's membrane. Here we show that active-species crossover can be arrested by scaling the membrane's pore size to molecular dimensions and in turn increasing the size of the active material to be above the membrane's pore-size exclusion limit. When oligomeric redox-active organic molecules were paired with microporous polymer membranes, the rate of active-material crossover was either completely blocked or slowed more than 9,000-fold compared to traditional separators at minimal cost to ionic conductivity. In the case of the latter, this corresponds to an absolute rate of ROM crossover of less than 3 μmol cm$^{-2}$ day$^{-1}$ (for a 1.0 M concentration gradient), which exceeds performance targets recently set forth by the (Continued)

battery industry. This strategy was generalizable to both high and low-potential ROMs in a variety of electrolytes, highlighting the importance of macromolecular design in implementing next-generation redox-flow batteries.

24 Claims, 16 Drawing Sheets

(58) Field of Classification Search
USPC .......................................................... 429/101
See application file for complete search history.

(56) References Cited

U.S. PATENT DOCUMENTS

| | | | | |
|---|---|---|---|---|
| 2014/0255821 | A1* | 9/2014 | Katayama | H01M 8/188 429/492 |
| 2015/0044537 | A1* | 2/2015 | Dong | H01M 8/0245 429/107 |
| 2015/0207165 | A1* | 7/2015 | Schubert | H01M 8/188 429/50 |
| 2016/0149251 | A1* | 5/2016 | Reece | H01M 8/188 429/105 |
| 2017/0346104 | A1 | 11/2017 | Helms et al. | |

OTHER PUBLICATIONS

Chae et al., Ultra-High Proton/Vanadium Selectivity for Hydrophobic Polymer Membranes with Intrinsi Nanopores for Redox Flow Battery, Advanced Energy Materials, vol. 6, 1600517 p. 1 (Year: 2016).*
Li et al., Polysulfide-Blocking Microporous Polymer Membrane Tailored for Hybrid Li-Sulfur Flow Batteries, Nano Letters, American Chemical Society Publications, pp. 5724-5727 (Year: 2015).*
MacDonald et al., Using intermolecular interactions to crosslink PIM-1 and modify its gas sorption properties, Journal of Materials Chemistry A, Royal Society of Chemistry, vol./Issue 3, pp. 4855-4864 (Year: 2015).*
Du et al., Azide-based Cross-Linking of Polymers of Intrinsic Microporosity (PIMs) for Condensable Gas Separation, Macromolecular Rapid Communications, V 32 No. 8, pp. 631-636 (Year: 2011).*
Song et al., Controlled thermal oxidative crosslinking of polymers of intrinsic microporosity towards tunable molecular sieve membranes, Nature Communications, pp. 1-12 (Year: 2014).*
Ansari et al. "Hierarchical Wood Cellulose Fiber/Epoxy Biocomposites—Materials Design of Fiber Porosity and Nanostructure." Composites Part A: Applied Science and Manufacturing 74:60-68 (2015).
Doris et al., "Macromolecular Design Strategies for Preventing Active-Material Crossover in Non-Aqueous All-Organic Redox-Flow Batteries". Angewandte Chemie 129:1617-1621 (2017).

* cited by examiner

US 11,329,304 B2

REDOX-FLOW BATTERIES EMPLOYING OLIGOMERIC ORGANIC ACTIVE MATERIALS AND SIZE-SELECTIVE MICROPOROUS POLYMER MEMBRANES

CROSS REFERENCE TO RELATED APPLICATIONS

This application claims priority to U.S. Provisional Application Ser. No. 62/342,764 filed May 27, 2016, which application is incorporated herein by reference as if fully set forth in their entirety.

STATEMENT OF GOVERNMENTAL SUPPORT

The invention described and claimed herein was made in part utilizing funds supplied by the U.S. Department of Energy under Contract No. DE-AC02-05CH11231 between the U.S. Department of Energy and the Regents of the University of California for the management and operation of the Lawrence Berkeley National Laboratory. The government has certain rights in this invention.

BACKGROUND OF THE INVENTION

Field of the Invention

The present invention relates to the field of redox-flow batteries.

Related Art

Most redox-flow batteries are plagued by the crossover of active materials. This crossover leads to decreased cell efficiency and cycle life. Previous attempts by others in the field to block the crossover of active-species often led to decreased membrane ionic conductivity, which reduces the rate capability of the cell.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

In the discussions that follow, various process steps may or may not be described using certain types of manufacturing equipment, along with certain process parameters. It is to be appreciated that other types of equipment can be used, with different process parameters employed, and that some of the steps may be performed in other manufacturing equipment without departing from the scope of this invention. Furthermore, different process parameters or manufacturing equipment could be substituted for those described herein without departing from the scope of the invention.

These and other details and advantages of the present invention will become more fully apparent from the following description taken in conjunction with the accompanying drawings. This invention consists of a new type of energy storage device that includes several new components.

All-Organic redox-flow batteries are well positioned to offer low-cost, multi-hour electrochemical energy storage at large scale in line with targets for grid modernization. During flow-battery operation, solutions of redox-active organic molecules (ROMs) in an aqueous and/or non-aqueous electrolytes are circulated through the negative and positive electrode compartments of an electrochemical cell (see FIG. 16). These compartments are electronically isolated from each other by a separator or ion-conducting membrane. In order to maximize cycle-life and efficiency, it is imperative to block ROMs from migrating between electrode compartments during cycling while also maintaining facile transport of the working ion.

Figure 1:
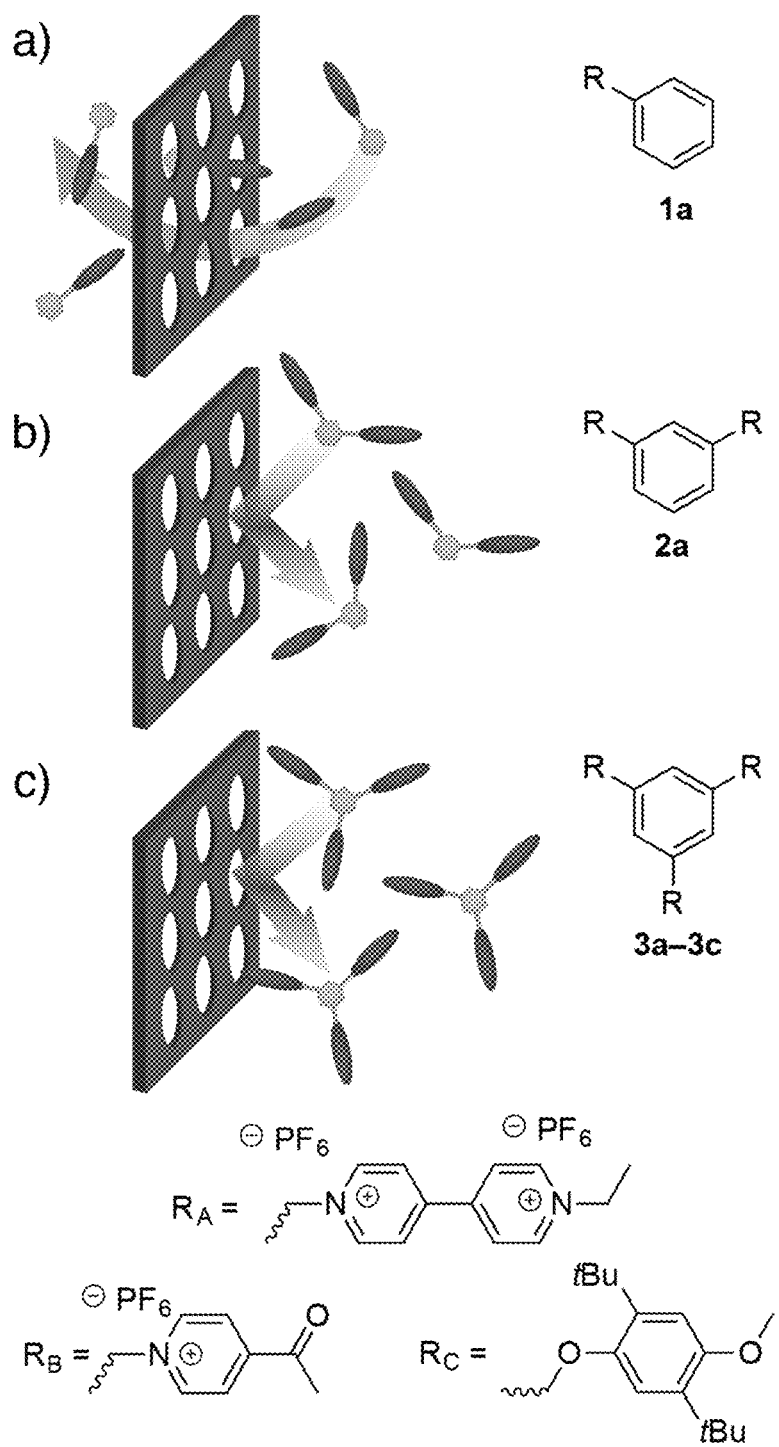
FIG. 1 illustrates a series of redox-active oligomers (RAOs), a viologen monomer (1a), a viologen dimer (2a), a viologen trimer (3a), an acylpyridinium trimer (3b), and a DB3 trimer (3c).

FIG. 1 illustrates a series of redox-active oligomers (RAOs), a viologen monomer (1a), a viologen dimer (2a), a viologen trimer (3a), an acylpyridinium trimer (3b), and a DB3 trimer (3c).

Figure 2:
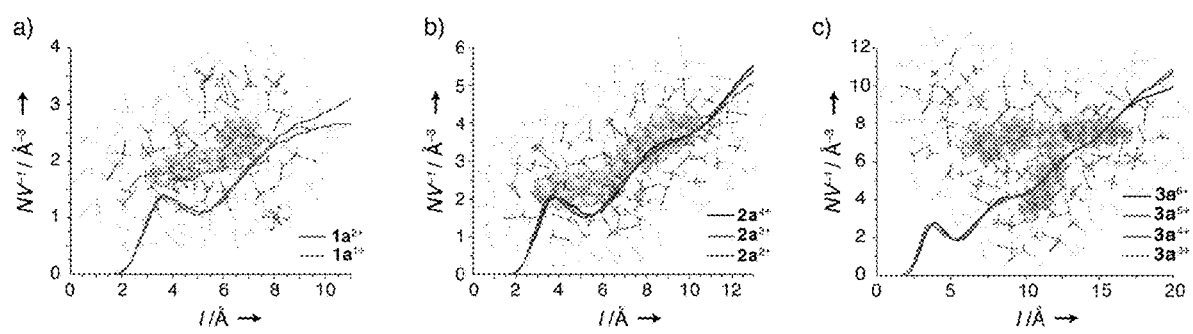
FIG. 2 illustrates an average number of ACN molecules as a function of distance from the molecule's Van der Waals surface.
Figure 4:
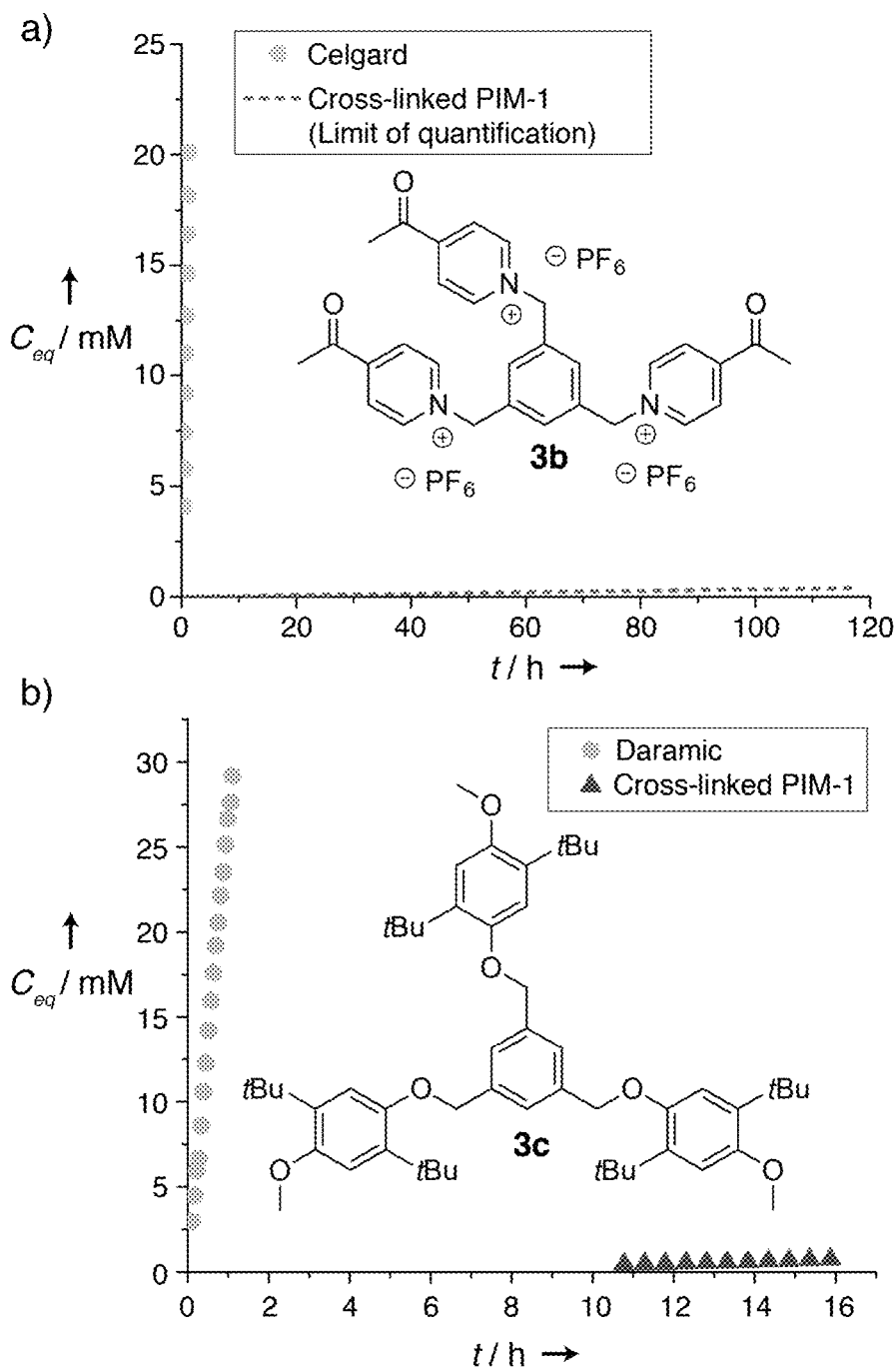
FIG. 4 illustrates that both an acylpyridinium trimer (3b) and a DB3 trimer (3c) were blocked by cross-linked PIM-1 membranes, with 3b diffusing through the membrane slower than the lower limit of quantification of $3.8 \times 10^{-11}$ cm$^2$ s$^{-1}$ and 3c diffusing through the membrane with $D_{eff}=(8.1 \pm 0.7) \times 10^{-10}$ cm$^2$ s$^{-1}$.

Various embodiments describe how this can be achieved through the development of new macromolecular design principles advanced and applied to ROMs and ion-selective membranes derived from polymers of intrinsic microporosity or mesoporosity (PIMs). In contrast with traditional mesoporous battery separators (pores with diameters between 2 and 50 nm), membranes derived from PIMs feature permanent micropores or mesopores that in principle could allow working-ion conduction while blocking the crossover of larger active-materials. Indeed, we found that the effective diffusion coefficient ($D_{eff}$) for small-molecule ROMs (see e.g., panel 1a) through PIM-1 membranes decreased 40-fold compared to a Celgard separator with ~20 nm pores. Additional gains in blocking ability (470-fold) were obtained with chemically cross-linked PIM-1 membranes, which restrict pore swelling in electrolyte. While these gains alone are impressive, we hypothesized that increasing the effective size of the ROM, e.g., through oligomerization, would in turn provide active-materials that were larger than the PIM membrane's pore-size exclusion limit and thereby enable active-material blocking through a size-sieving mechanism. Indeed, by increasing slightly the molecular dimensions from 8.8 to 12.3 Å through oligomerization, $D_{eff}$ fell below our experimental limit of quantification, with an estimated upper-bound of $3.4 \times 10^{-11}$ cm$^2$ s$^{-1}$ (see FIG. 2). Despite this dramatic 9,000-fold improvement in membrane blocking ability relative to Celgard, PIM-1 membranes retained high ionic conductivities of at least 0.4 mS cm$^{-1}$ (compared to 2.2 mS cm$^{-1}$ for Celgard). Furthermore, we found that sieving oligomeric organic active materials by size with PIM membranes was general to different ROM chemistries (see e.g., panels 3b and 3c of FIG. 4) in a variety of battery electrolytes (e.g., ACN, PC, DME, etc), highlighting the generality of our approach.

Breaking with convention, the advances described herein provide an important counterpoint to: 1) single-component electrodes paired with ceramic membranes, which are expensive and difficult to scale; 2) thick macroporous separators paired with mixed-electrode formulations (i.e., anolytes and catholytes present in both electrode compartments), which lead to Coulombic inefficiencies and short cycle-life; and 3) mesoporous separators paired with redox-active polymers, which can be difficult to pump through electrochemical cells at high molecular weight and at all states-of-charge. Our strategy to implement ROM oligomerization, as opposed to polymerization, should also serve to retain the facile charge transfer kinetics that are characteristic of ROM monomers, which is essential for power quality and high active-material utilization.

To quantitatively inform the critical size regime for ROM-blocking by a size-selective polymer membranes, we designed a series of viologen-based redox-active oligomers (RAOs) (see panels 1a-3a, FIG. 1) and studied their solvated structures computationally in acetonitrile (ACN) using a combination of ab initio quantum mechanical studies and classical molecular dynamics simulations (see Materials section, FIGS. 5-9, Tables 1-2). Viologens are bipyridinium derivatives of 4,4'-bipyridyl.

Our RAO design was structurally minimal, with redox-active viologens serving as pendants to a central mesitylene (1,3,5-trimethylbenzene) core (see FIG. 1). We were interested in understanding active-material solvation at different states of charge (SOCs), as changes in solvation may affect the crossover behavior as the battery is cycled. We found cationic viologen pendants at all SOCs. For each redox-active oligomer, we calculated the average number of ACN molecules as a function of distance from the molecule's Van der Waals surface (see FIG. 2) and found that the ROM solvation shells do not change significantly at different SOCs. This implies that membranes that are blocking to active-materials at one SOC will also block their crossover as the battery is cycled and the SOC changes. Furthermore, ACN molecules in the solvation shell are only weakly associated with the ROMs, and the solvation of ROMs in ACN does not lead to significant changes in their structural conformation with respect to isolated geometries. Therefore, the hydrodynamic radii and associated volumes of ROMs can be computed from quantum mechanical calculations of isolated clusters. Characteristic sizes for viologen monomer (1a), dimer (2a) and trimer (3a) were 8.8, 12.3, and 16.8 Å, respectively. These results suggest that polymer membranes whose pore dimensions were maintained below 1.2 nm would be effective in blocking the viologen dimer and trimer; considerably smaller pores would be required to sieve the monomer.

TABLE 1

Comparison between two charge schemes: GAFF vs. Mulliken charges from ab initio DFT calculations: 1a at two different states of charge:

| GAFF | | Mulliken | | |
|---|---|---|---|---|
| Rom (1+) | Rom (2+) | Rom (1+) | Rom (2+) | |
| −0.086 | −0.015 | −0.085 | −0.138 | C |
| −0.216 | −0.232 | −0.167 | −0.123 | C |
| 0.053 | 0.083 | 0.073 | 0.042 | C |
| −0.206 | −0.219 | −0.167 | −0.123 | C |
| −0.115 | −0.067 | −0.085 | −0.014 | C |
| 0.211 | 0.193 | 0.026 | 0.055 | N |
| 0.187 | 0.234 | 0.174 | 0.229 | H |
| 0.121 | 0.233 | 0.161 | 0.203 | H |
| 0.124 | 0.231 | 0.161 | 0.203 | H |
| 0.188 | 0.237 | 0.174 | 0.229 | H |
| −0.141 | −0.118 | −0.026 | −0.016 | C |
| −0.205 | −0.2 | −0.208 | −0.125 | C |

TABLE 1-continued

Comparison between two charge schemes: GAFF vs.
Mulliken charges from ab initio DFT calculations:
1a at two different states of charge:

| GAFF | | Mulliken | | |
|---|---|---|---|---|
| Rom (1+) | Rom (2+) | Rom (1+) | Rom (2+) | |
| 0.048 | 0.049 | 0.065 | 0.023 | C |
| −0.177 | −0.177 | −0.208 | −0.125 | C |
| −0.188 | −0.175 | −0.026 | −0.016 | C |
| 0.305 | 0.296 | 0.091 | 0.055 | N |
| 0.2 | 0.234 | 0.145 | 0.232 | H |
| 0.129 | 0.217 | 0.166 | 0.198 | H |
| 0.129 | 0.219 | 0.166 | 0.198 | H |
| 0.193 | 0.277 | 0.145 | 0.232 | H |
| −0.29 | −0.256 | −0.124 | 0.0546 | C |
| 0.228 | 0.275 | 0.114 | 0.112 | H |
| 0.139 | 0.182 | 0.114 | 0.112 | H |
| 0.0085 | −0.095 | 0.0222 | −0.2 | C |
| −0.097 | −0.094 | −0.074 | −0.101 | C |
| −0.152 | −0.138 | −0.129 | −0.119 | C |
| −0.125 | −0.132 | −0.148 | −0.069 | C |
| −0.136 | −0.134 | −0.129 | −0.119 | C |
| −0.133 | −0.11 | −0.074 | −0.101 | C |
| 0.134 | 0.145 | 0.161 | 0.141 | H |
| 0.173 | 0.204 | −0.128 | 0.166 | H |
| 0.174 | 0.201 | 0.555 | 0.169 | H |
| 0.174 | 0.193 | −0.128 | 0.166 | H |
| 0.131 | 0.144 | 0.161 | 0.141 | H |
| −0.347 | −0.352 | 0.0089 | −0.042 | C |
| 0.218 | 0.232 | 0.074 | 0.116 | H |
| 0.186 | 0.252 | 0.074 | 0.116 | H |
| 0.161 | 0.181 | 0.744 | 0.116 | H |

TABLE 2

Comparison between two charge schemes: GAFF vs. Mulliken charges
from ab initio DFT calculations: acetonitrile and $PF_6^-$:

| Mulliken ACN | GAFF ACN | |
|---|---|---|
| 0.206 | 0.2087 | C |
| −0.438 | −0.376 | N |
| −0.29 | −0.05 | C |
| 0.1734 | 0.0707 | H |
| 0.1734 | 0.0707 | H |
| 0.1734 | 0.0707 | H |

| $PF_6$ (1−) | $PF_6$ (1−) | |
|---|---|---|
| 0.6483 | 1.2416 | P |
| −0.275 | −0.374 | F |
| −0.275 | −0.374 | F |
| −0.275 | −0.374 | F |
| −0.275 | −0.374 | F |
| −0.275 | −0.374 | F |
| −0.275 | −0.374 | F |

Figure 3A:
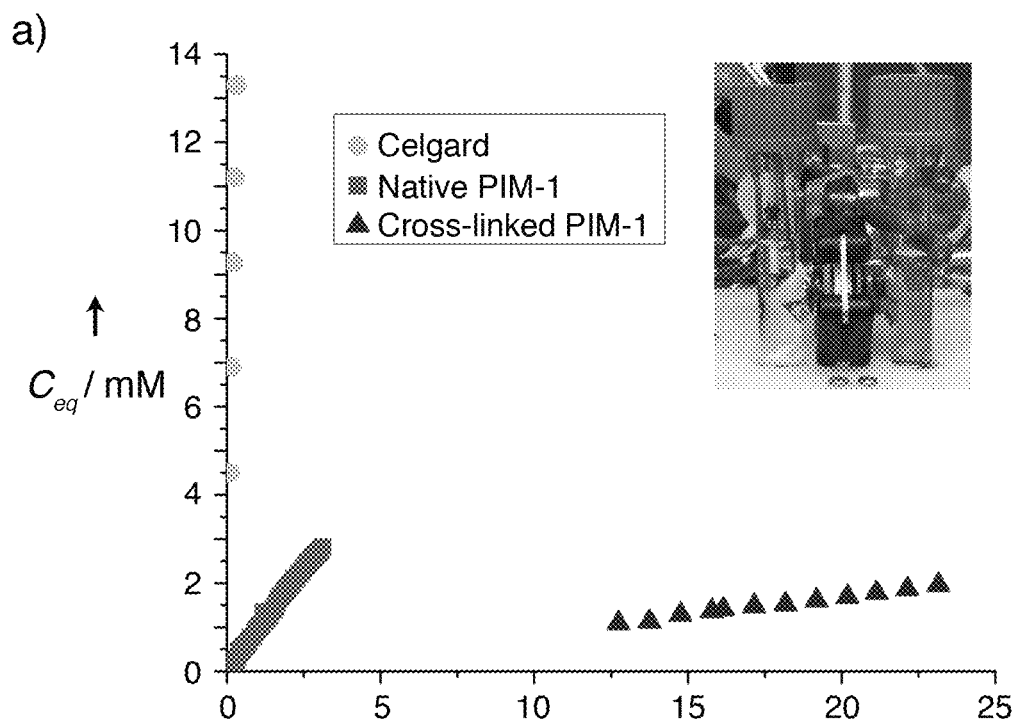
FIG. 3A illustrates an equivalent concentration ($C_{eq}$) the concentration of ROM that would be observed with a 10 µm membrane and $C_0$=0.1 M.
Figure 3B:
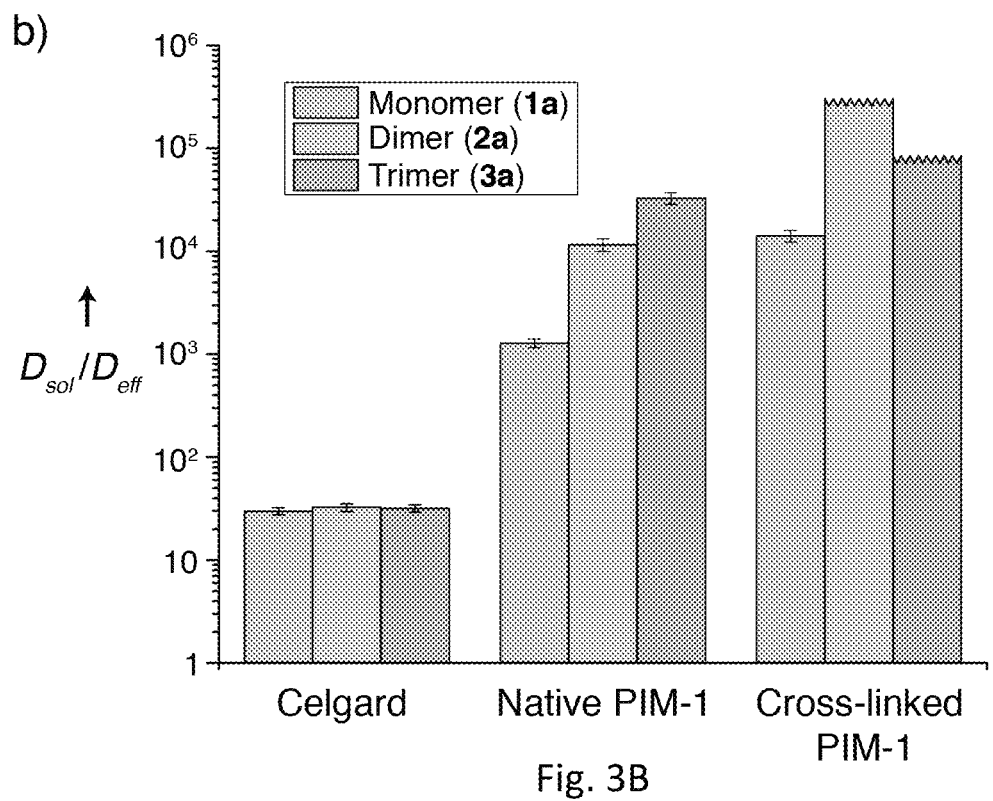
FIG. 3B illustrates measuring the effective diffusion coefficient ($D_{eff}$) of each ROM through different membranes.
Figure 10:
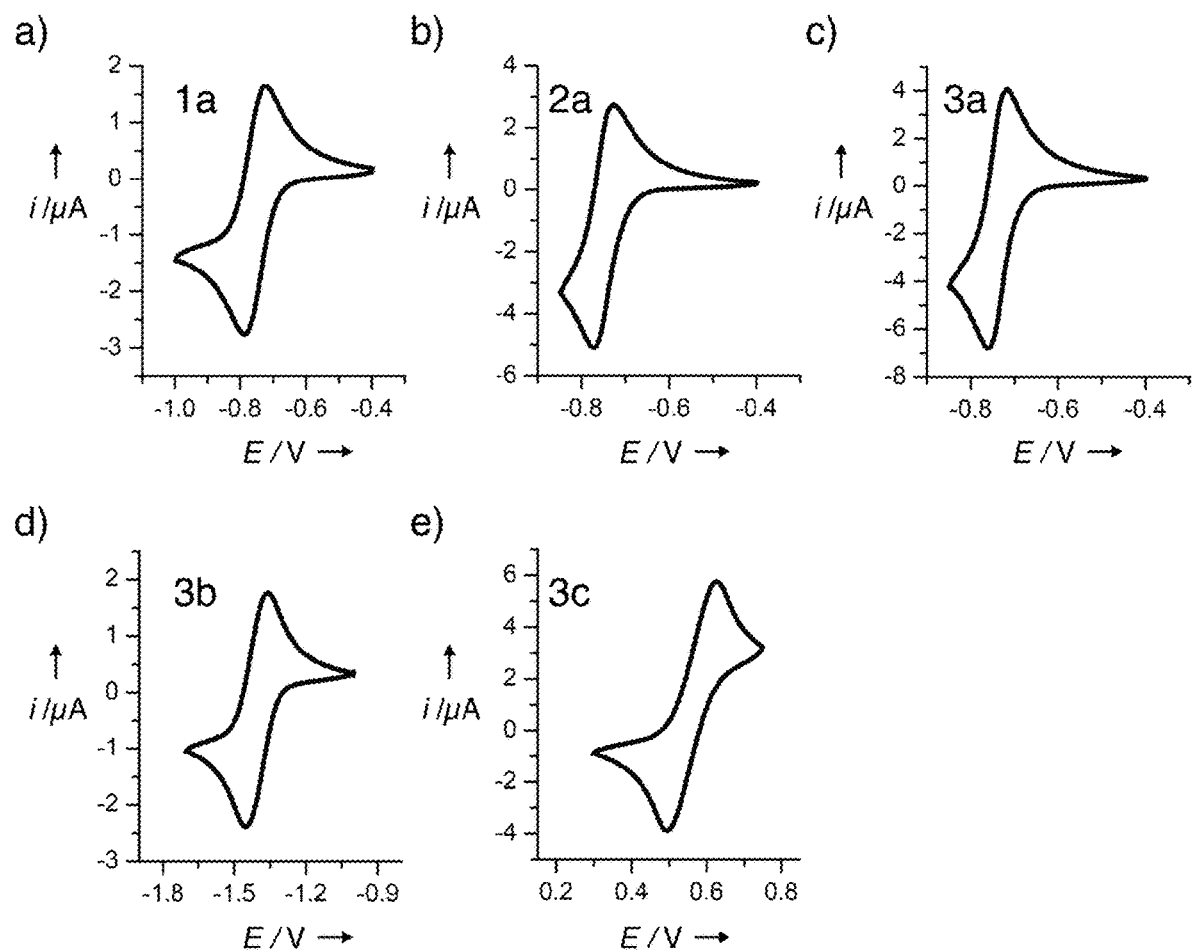
FIG. 10 illustrates cyclic voltammetry of a) 1a, b) 2a, c) 3a, d) 3b, and e) 3c. All cyclic voltammograms were collected with a 1 mm glassy carbon working electrode and Pt wire counter-electrode. All potentials are given vs. Ag/Ag$^+$. The scan rate was 100 mV s$^{-1}$. All CVs were acquired with 1 mM ROM in 0.1 M LiPF$_6$ in acetonitrile (a-c), 0.1 M TBAPF$_6$ in propylene carbonate (d), or 0.1 M TBAPF$_6$ in dimethoxyethane (e).

To validate the theoretical predictions of a critical size-regime for ROM-blocking, we synthesized the viologen-based ROM monomer (panel 1a, 84%), dimer (panel 2a, 80%), and trimer (panel 3a, 69%) by a simple displacement reaction involving N-ethyl-4,4'-bipyridinium hexafluorophosphate and benzyl bromide, 1,3-bis(bromomethyl)benzene, and 1,3,5-tris(bromomethyl)benzene, respectively. Cyclic voltammetry of each compound showed that 1a, 2a, and 3a are reversibly reduced at −0.75 V vs. Ag/Ag$^+$ (see FIG. 10, Table 3). This low reduction potential along with the high solubility of each species in ACN is promising for their use as energy dense anolytes in all-organic redox flow batteries. The crossover behavior for each ROM/membrane pairing was quantified by measuring the effective diffusion coefficient ($D_{eff}$) of each ROM through different membranes (see FIG. 3A, FIGS. 11-12, see Materials for details). By comparing the ROM's diffusion coefficient through the membrane ($D_{eff}$) to its diffusion coefficient through solution ($D_{sol}$), the membrane's blocking ability can be quantified. For the non-selective Celgard membrane, high values for $D_{eff}$ of $(5.4\pm0.4)\times10^{-7}$, $(3.1\pm0.3)\times10^{-7}$, and $(2.2\pm0.2)\times10^{-7}$ cm$^2$ s$^{-1}$ for 1a, 2a, and 3a, respectively, were measured. These measured values of $D_{eff}$ are only 30-fold lower than $D_{sol}$ for each ROM, indicating that the blocking-ability of Celgard is poor, and that it blocks 1a, 2a, and 3a equally poorly. PIM-1 membranes, which feature nanometer-sized pores, significantly outperformed Celgard, with 1a, 2a, and 3a diffusing through the membrane 1,280, 11,600, and 32,900-fold slower, respectively, than through solution (see FIG. 3B). This dramatic improvement in membrane blocking-ability upon reducing the pore size from approximately 20 nm to less than 1 nm, along with the improved membrane blocking-ability for larger ROMs, is indicative of size-selective blocking of active-materials. However, our theoretical calculations of the sizes of 2a and 3a imply that they should be completely blocked by PIM-1 membranes. We hypothesized that this discrepancy was a result of the PIM-1 membranes swelling significantly in electrolyte, thus increasing the average pore size above the 0.9 nm pores present in dry membranes.

TABLE 3

Redox potentials of ROMs 1a-3c calculated from CVs acquired
with: $C_{ROM}$ = 1 mM and v = 100 mVs$^{-1}$

| Molecule | Electrolyte | $E_{1/2}$ (V vs. Ag/Ag$^+$) | $\Delta E_p$ (mV) |
|---|---|---|---|
| Viologen monomer (1a) | 0.1M LiPF$_6$ in ACN | −0.756 | 58 |
| Viologen dimer (2a) | 0.1M LiPF$_6$ in ACN | −0.752 | 38 |
| Viologen trimer (3a) | 0.1M LiPF$_6$ in ACN | −0.742 | 39 |
| Acylpyridinium trimer (3b) | 0.1M TBAPF$_6$ in PC | −1.404 | 88 |
| DB3 trimer (3c) | 0.1M TBAPF$_6$ in DME | 0.562 | 124 |

Figure 13:
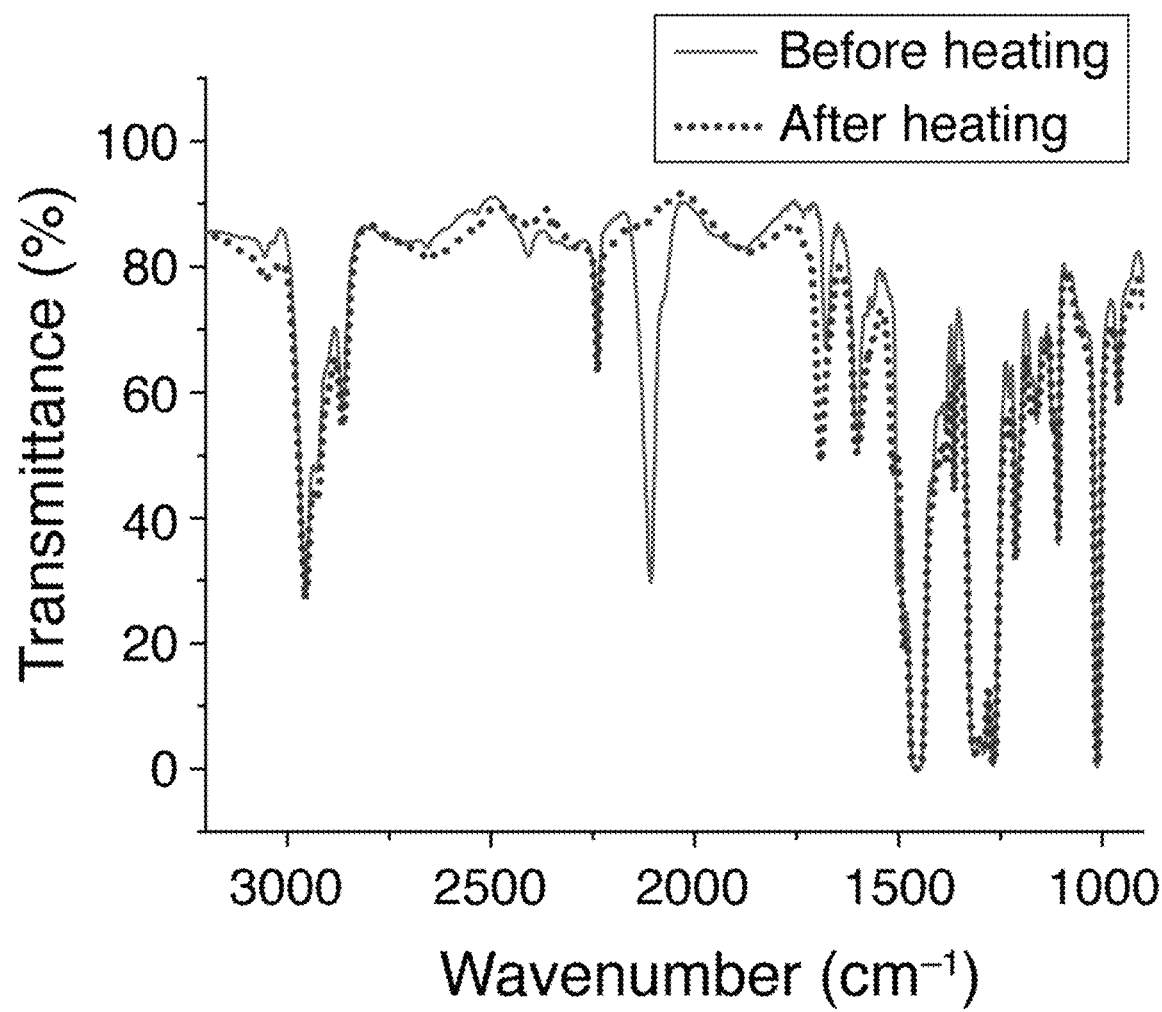
FIG. 13 illustrates FT-IR spectra of membranes cast from PIM-1 with 0.1 molar equivalents of cross-linker before (solid) and after (dotted) heating at 175° C. for 7.5 h. Complete disappearance of the azide peak at 2110 cm$^{-1}$ indicates completion of the cross-linking reaction.
Figure 14:
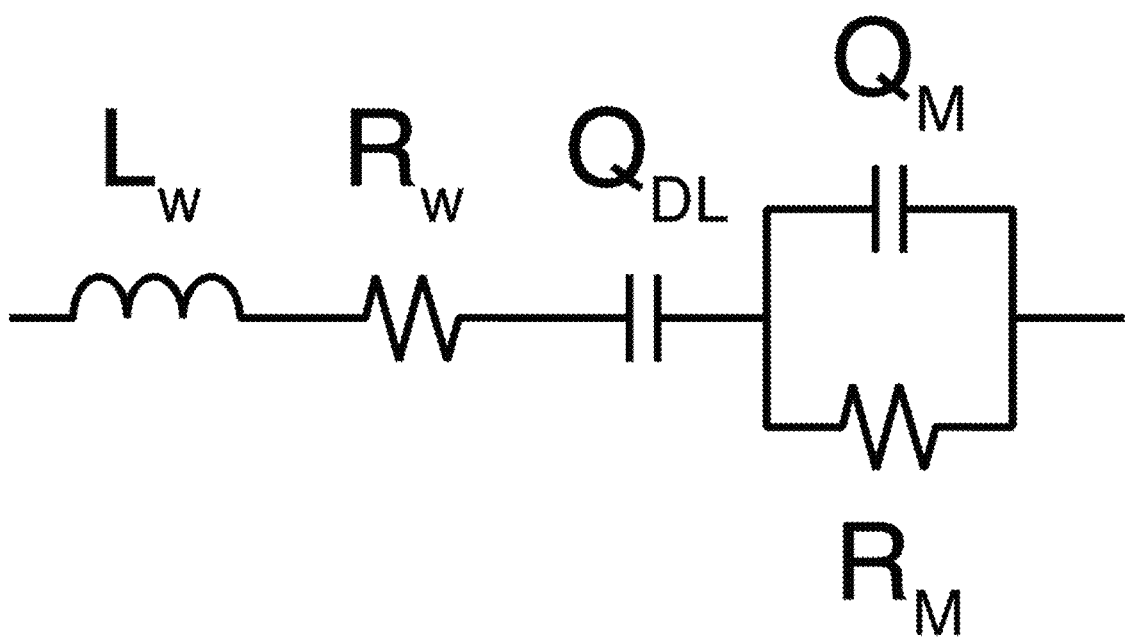
FIG. 14 illustrates an equivalent circuit used to model electrochemical impedance spectra of membranes soaked in electrolyte. $R_W$ and $L_W$ correspond to the resistance and inductance of the wiring leading from the potentiostat to the conductivity cell, respectively. $Q_{DL}$ and $Q_M$ correspond to the double layer and membrane capacitances, and $R_M$ corresponds to the ionic resistance of the membrane.
Figure 15:
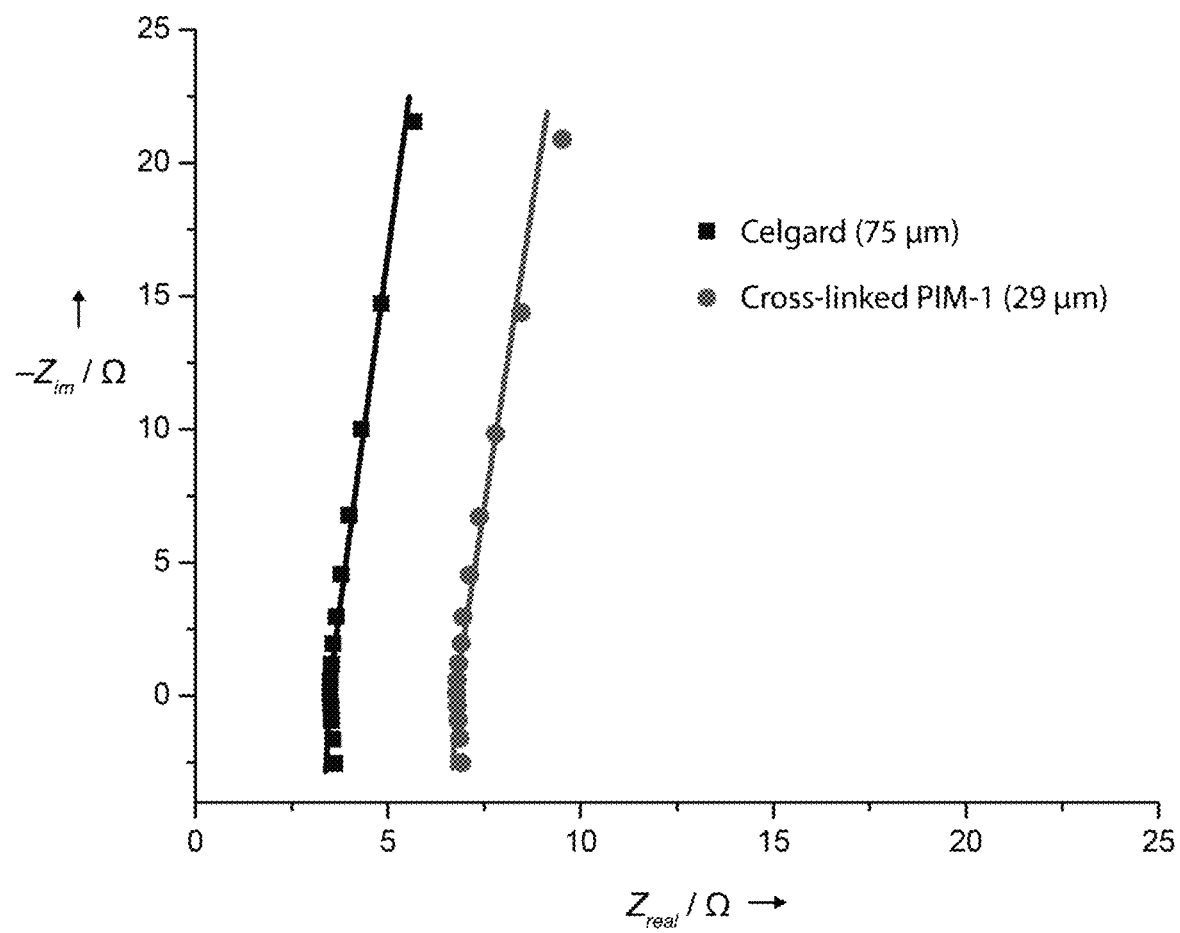
FIG. 15 illustrates measured EIS spectra (points) for Celgard (black squares) and cross-linked PIM-1 (circles) membranes along with fits (lines).

By cross-linking PIM-1, the degree of swelling can be controlled, and the membrane pore size can be further constricted. This was accomplished by casting solutions of PIM-1 containing the cross-linking agent 2,6-bis(4-azido-benzylidene)-cyclohexanone. The dry membranes were then heated to 175° C. under vacuum to convert the azide groups of the cross-linking agent to reactive nitrenes, which inserts into C—H bonds on the polymer and cross-links the membranes (see FIG. 13). Cross-linked PIM-1 membranes exhibited the best active-species blocking-ability observed to date, with 1a diffusing through the membrane 14,200-fold slower than through solution, and 2a and 3a diffusing slower than the limit of quantification (297,000 and 85,000-fold slower, respectively, than through solution). This unprecedented 9,000-fold improvement in blocking ability (with respect to Celgard) came at minimal cost to ionic conductivity, with cross-linked PIM-1 membranes only 5-fold less conductive than Celgard (0.4 vs. 2.2 mS cm$^{-1}$, see Fig. S10-11).

To demonstrate that oligomerization is a generalizable approach to blocking ROM crossover in all-organic non-aqueous redox flow batteries, we synthesized trimeric RAOs based on acylpyridinium hexafluorophosphates (3b, 89%) and DB3 (3c, 90%) redox-active pendant groups. Monomeric forms of these ROMs have been identified as promising candidates for non-aqueous redox-flow batteries, although their crossover through the battery membrane remains an issue that needs to be solved. Consistent with these reports, cyclic voltammetry showed evidence for reversible reduction of 3b at −1.40 V vs. Ag/Ag$^+$ in 0.1 M TBAPF$_6$/propylene carbonate. Likewise, 3c underwent reversible oxidation at 0.56 V vs. Ag/Ag$^+$ in 0.1 M TBAPF$_6$/dimethoxyethane. Both 3b and 3c were blocked by cross-linked PIM-1 membranes, with 3b diffusing through the membrane slower than the lower limit of quantification of $3.8\times10^{-11}$ cm$^2$ s$^{-1}$ and 3c diffusing through the membrane with $D_{eff}=(8.1\pm0.7)\times10^{-10}$ cm$^2$ s$^{-1}$ (see FIG. 4). This corresponds to 6,800 and 460-fold improvements in the crossover rate of 3b and 3c, respectively, when compared to their diffusion through non-selective mesoporous separators.

Clearly, oligomerization provides a straightforward path to preparing a wide variety of ROMs that can be effectively blocked by microporous polymer membranes.

Macromolecular design of both membranes and active-species is a powerful approach for solving the crossover problem in all-organic redox-flow batteries. Here we showed how computational chemistry informs the design space for ROM oligomers, or RAOs, and that by pairing RAOs with RAO-blocking microporous PIM membranes, active material crossover can be reduced by nearly four orders of magnitude with respect to commercially available battery separators with negligible decreases in ionic conductivity. ROM oligomerization was demonstrated for several redox-active motifs, including those that serve as either negative and positive electrode materials in redox-flow batteries. In all cases, RAO crossover was effectively blocked when constituted as flowable electrodes in a variety of battery solvents, including acetonitrile, propylene carbonate, and 1,2-dimethoxyethane. These promising results point the way forward towards the design of new classes of ROMs and membranes for all-organic redox-flow batteries, along with their incorporation in next-generation redox-flow battery prototypes.

Experimental Section

Materials and methods, synthetic details, characterization, and membrane preparation are all described below. All membranes were soaked in electrolyte (0.1 M LiPF$_6$ in ACN for 1a-3a, 0.1 M TBAPF$_6$ in PC for 3b, or 0.1 M TBAPF$_6$ in DME for 3c) for at least 12 h before use. Equivalent concentration ($C_{eq}$) refers to the concentration of ROM that would be observed with a 10 μm membrane and $C_0$=0.1 M. This allows for easier visual comparison of crossover experiments performed with different membrane thicknesses (raw data can be found below).

Supporting Information

Materials

Ammonium hexafluorophosphate, 4,4-bipyridine, bromomethylbenzene, 1,3-bis(bromomethyl)benzene, 1,3,5-tris(bromomethyl)benzene, chloroform-d$_3$ (99.5% atom D), 1,2-dimethoxyethane (DME, 99.5%, anhydrous), ethyl iodide, potassium carbonate, propylene carbonate (PC, 99.7%, anhydrous), silver (I) hexafluorophosphate (99.99% trace metals grade), tetrabutylammonium hexafluorophosphate (TBAPF$_6$, 99.0%), tetrafluoroterephthalonitrile (99%), and 3,3,3',3'-tetramethyl-1,1'-spirobisindane-5,5',6,6'-tetraol (96%) were obtained from Sigma-Aldrich. Battery grade lithium hexafluorophosphate (LiPF$_6$) (99.9+%) was obtained from STREM Chemicals, Inc. 2,6-Bis(4-azidobenzylidene)cyclohexanone (90%, wetted with ca. 30% water) was obtained from TCI. N-ethyl-4,4'-bipyridinium hexafluorophosphate and viologen monomer (1a) were synthesized using reported protocols. Glassy carbon electrodes with 1 mm diameter were purchased from BAS Inc. (West Lafayette, Ind.) and polished before each experiment with 3-μm diamond paste. Ag/Ag+ reference electrodes were purchased from CHI instruments (Austin, Tex.) and filled with 10 mM silver (I) hexafluorophosphate in 0.5 M LiPF$_6$ in ACN (for experiments in ACN) or 0.1 M TBAPF$_6$ in PC or DME (for experiments in PC or DME, respectively). Celgard® 2325 was purchased from Celgard (Charlotte, N.C.). Daramic 175 was received as a free sample from Daramic (Charlotte, N.C.). N,N-dimethylformamide (DMF) and acetonitrile (ACN) were taken from a JC Meyer solvent system. Chloroform (HPLC grade) and methanol were obtained from EMD Millipore. All chemicals were used as received unless otherwise specified. Lithium hexafluorophosphate and tetrabutylammonium hexafluorophosphate were dried under vacuum for 16 h at 100° C. and 90° C., respectively. ACN was dried over 3 Å molecular sieves to <20 ppm water. For experiments with ROM and RAOs 1a-3a, electrolyte refers to 0.1 M LiPF$_6$ in acetonitrile. For experiments with RAOs 3b or 3c, electrolyte refers to 0.1 M tetrabutylammonium hexafluorophosphate in propylene carbonate or 1,2-dimethoxyethane, respectively.

Instrumentation

Unless otherwise mentioned, all manipulations were performed in an argon glovebox with oxygen and water levels below 5 and 1 ppm, respectively. $^1$H and $^{13}$C NMR spectra were recorded on Bruker Avance II 500 MHz, Varian Unity 500, and VXR 500 NMR spectrometers. Chemical shifts are reported in δ (ppm) relative to the residual solvent peak (CD$_3$CN: 1.94 for $^1$H; 1.32 for $^{13}$C, CDCl$_3$: 7.24 for $^1$H; 77.23 for $^{13}$C, DMSO-d$_6$: 2.50 for $^1$H; 39.51 for $^{13}$C). Coupling constants (J) are expressed in Hertz (Hz). Splitting patterns are designated as s(singlet), d(doublet), t(triplet), q(quartet), dd(doublet of doublets), and m(multiplet). Low- and high-resolution EI mass spectra were recorded on a Micromass 70-VSE spectrometer. Low- and high-resolution ESI mass spectra were recorded on a Synapt G2 Q-Tof spectrometer. High-resolution ESI-MS of 3b and 3c were performed by the University of California, Berkeley QB3/Chemistry Mass Spectrometry Facility. Elemental analyses were performed by the University of California, Berkeley College of Chemistry Microanalytical Facility. Polymer molecular weight was measured using size-exclusion chromatography with a Malvern Viscotek TDA 302 system calibrated with a 99 kDa monodisperse polystyrene standard. Electrochemical experiments were performed on a Bio-Logic VMP3 potentiostat. Cyclic voltammograms were acquired with iR drop compensation by measuring the uncompensated resistance with a 100 kHz impedance measurement and correcting for 85% of the expected drop. FT-IR spectra were acquired in transmission mode on a Varian 3100 FT-IR spectrometer. Water content measurements were performed on a Mettler Toledo C20 Coulometric KF Titrator Karl-Fischer apparatus.

Synthesis of N-ethyl-4,4'-bipyridinium hexafluorophosphate

N-ethyl-4,4'-bipyridinium hexafluorophosphate was synthesized as described previously. Briefly, ethyl iodide (5.12 mL, 64.0 mmol, 1.0 equiv) was added to a solution of 4,4-bipyridine (10.0 g, 64.0 mmol, 1.0 equiv) in DCM (50 mL). As the reaction progressed, an orange solid precipitated from solution. The mixture was stirred for 24 h at RT, and additional orange solid was precipitated from solution by adding diethyl ether. The solid was isolated by filtration and rinsed with DCM/ether (1:1 v/v). The solid was then dissolved in a minimum volume of water and ammonium hexafluorophosphate (53.0 g, 325 mmol, 5.0 equiv) was added portion-wise. As ammonium hexafluorophosphate was added, a beige solid precipitated out of solution. The resulting mixture was stirred for 24 h, and the solid was isolated by filtration, followed by rinsing with water, methanol, and ether. The resulting solid was dried under vacuum for 24 h to yield N-ethyl-4,4'-bipyridinium hexafluorophosphate (6.27 g, 30% yield, 2 steps) as a beige solid.

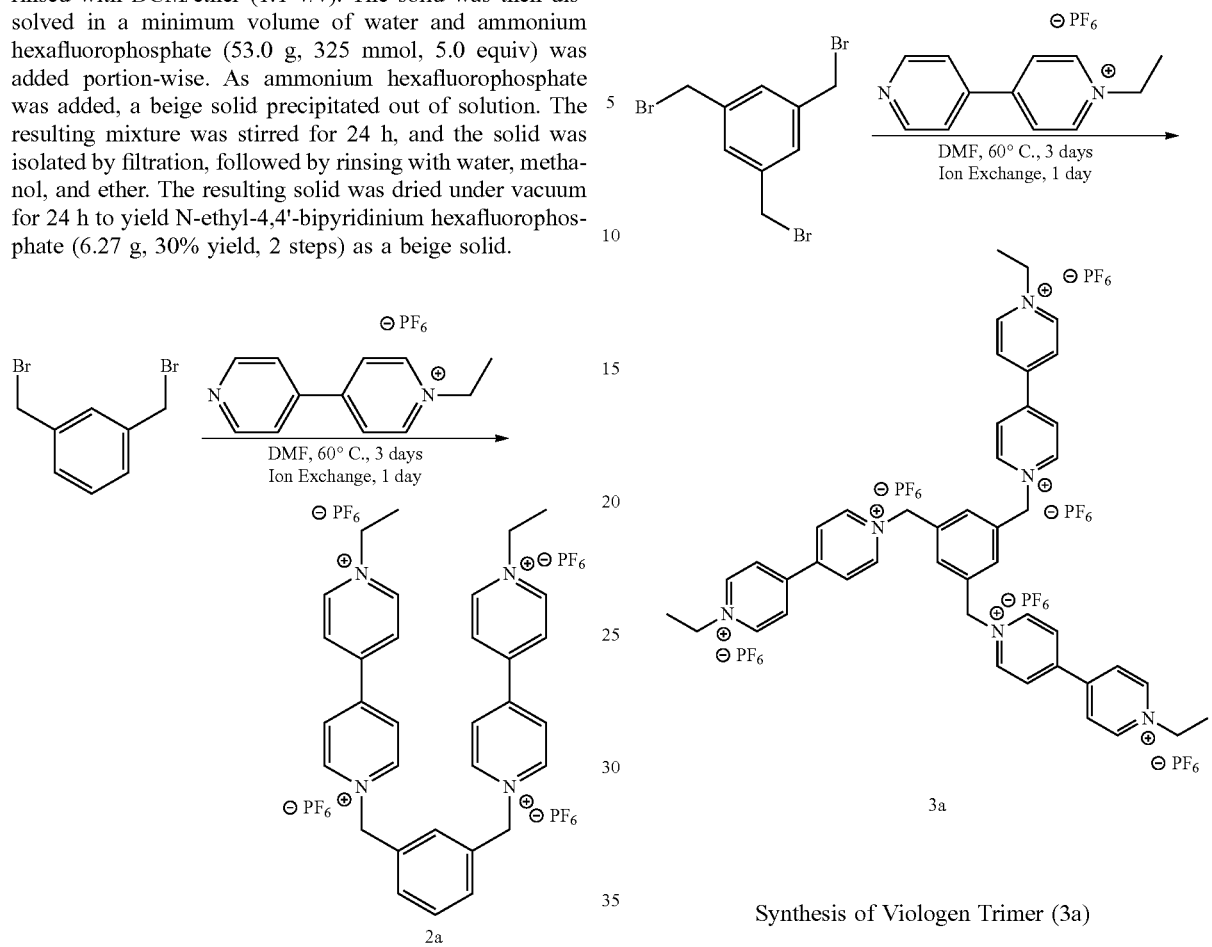

Synthesis of Viologen Dimer (2a)

1,3-Bis(bromomethyl)benzene (2.5 g, 9.47 mmol, 1.0 equiv) was reacted with N-Ethyl-4,4'-bipyridinium hexafluorophosphate (12.5 g, 37.9 mmol, 4 equiv) in DMF. The solution was then allowed to reach 60° C. and stirred at this temperature for 3 days. Solids precipitated out as the reaction progressed. The mixture was added to diethyl ether, and the solids filtered and rinsed with additional diethyl ether. The solids were then dissolved in a minimal amount of acetonitrile/water (1:4, v/v) and ammonium hexafluorophosphate (10 equiv) in a minimal amount of water was added portion wise. The resulting mixture was stirred for 24 h. Acetonitrile was removed under reduced pressure and water was added to the mixture to further precipitate out the solid. The solid was filtered out and rinsed with water, methanol, and diethyl ether. The product was dried under vacuum for 24 h to yield the viologen dimer, 2a (8.0 g, 80%, 2 steps) as a white powder. $^1$H NMR (500 MHz, CD$_3$CN) δ=8.96-8.91 (m, 8H), 8.41-8.38 (m, 8H), 7.61-7.60 (m, 4H), 5.84 (s, 4H), 4.68 (q, J=7.5 Hz, 4H), 1.65 ppm (t, J=5 Hz, 6H); $^{13}$C NMR (125 MHz, CD$_3$CN) δ=151.7, 150.9, 146.8, 146.4 (t, J=8.1 Hz), 146.4, 134.9, 131.9, 131.8, 131.5, 128.5, 128.3, 65.2, 58.8, 16.6 ppm; HRMS (ESI-TOF): m/z for C$_{32}$H$_{34}$F$_{18}$N$_4$P$_3$(M−PF6)$^+$ calculated 909.1709; found 909.1667.

Synthesis of Viologen Trimer (3a)

1,3,5-tris(bromomethyl)benzene (3.37 g, 9.46 mmol, 1.0 equiv) was reacted with N-ethyl-4,4'-bipyridinium hexafluorophosphate (10.0 g, 30.28 mmol, 3.2 equiv) in DMF. The solution was then allowed to reach 60° C. and stirred at this temperature for 3 days. Solid precipitated out as the reaction progressed. The mixture was added to diethyl ether, and the solid was filtered out and rinsed with additional diethyl ether. The solid was then dissolved in a minimal amount of acetonitrile/water (1:4, v/v) and ammonium hexafluorophosphate (10 equiv) in a minimal amount of water was added portion wise. The resulting mixture was stirred for 24 h. Acetonitrile was removed under reduced pressure and water was added to the mixture to further precipitate out the solid. The solid was filtered out and rinsed with water, methanol, and diethyl ether. The solid was dried under vacuum for 24 h to yield the viologen trimer, 3a (10.3 g, 69%, 2 steps) as a white powder. $^1$H NMR (500 MHz, CD$_3$CN) δ=8.92 (d, J=10 Hz, 12H), 8.41-8.37 (m, 12H), 7.67 (s, 3H), 5.84 (s, 6H), 4.68 (q, J=7.5 Hz, 6H), (t, J=7.5 Hz, 9H) 1.65 ppm

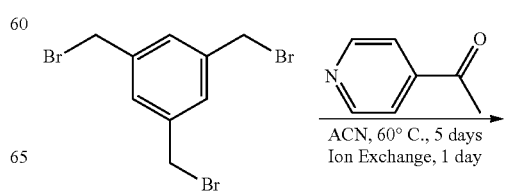

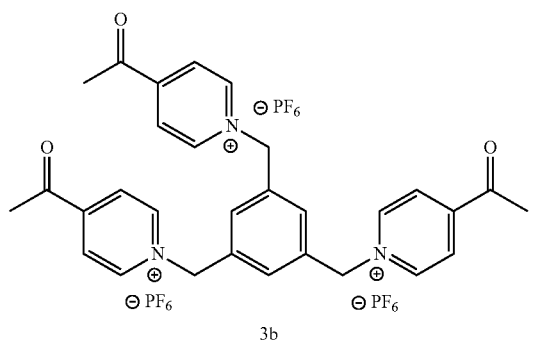

3b

Synthesis of Acylpyridinium Trimer (3b)

4-Acetylpyridine (10.0 g, 83 mmol, 4.0 equiv) was added to a solution of 1,3,5-tris(bromomethane)benzene (7.4 g, 21 mmol, 1.0 equiv) in acetonitrile (100 mL). The solution was stirred at 60° C. for 5 days. A precipitate formed, and was filtered and rinsed with diethyl ether. The solid was then dissolved in acetonitrile and water, and ammonium hexafluorophosphate (21.0 g, 130 mmol, 6.2 equiv) was added. The mixture was stirred overnight. Acetonitrile was removed under reduced pressure, and the solid was filtered off, dissolved in a minimal amount of acetonitrile, and precipitated by adding excess water with vigorous stirring. This process was repeated once more, followed by rinsing the solid with methanol (2×) and diethyl ether. The product was dried overnight to yield 17 g of the acylpyridinium trimer, 3b (89%, over 2 steps). Further purification of 3b was carried out by dissolving the crude mixture in a minimal amount of acetonitrile and then filtering away the dark-colored solids. Water was added to the filtrate and the mixture was cooled at 4° C. to precipitate 3b as a tan solid, which was isolated by filtration. The product was washed with methanol (50 mL) and diethyl ether (50 mL) before drying in vacuo. $^1$H NMR (500 MHz, DMSO-$d_6$) δ=9.28 (d, J=7 Hz, 6H), 8.55 (d, J=7 Hz, 6H), 7.62 (s, 3H), 5.90 (s, 6H), 2.76 (s, 9H) ppm; $^{13}$C{$^1$H} NMR (125 MHz, DMSO-$d_6$) δ=160.6, 149.0, 146.6, 135.8, 126.4, 62.8, 27.4 ppm; HRMS (ESI): m/z for $C_{30}H_{30}O_3N_3^{3+}$ (M−3PF$_6^-$)$^{3+}$ calculated 160.0757; found 160.0755, m/z for $C_{30}H_{30}O_3N_3PF_6^{2+}$ (M−2PF$_6^-$)$^{2+}$ calculated 312.5959; found 312.5955, m/z for $C_{30}H_{30}O_3N_3P_2F_{12}^+$ (M−PF$_6^-$)$^+$ calculated 770.1565; found 770.1554; Anal. Calc'd for $C_{30}H_{30}P_3F_{18}N_3O_3$: C, 39.36; H, 3.30; N, 4.59; Found: C, 39.23; H, 3.48; N, 4.49.

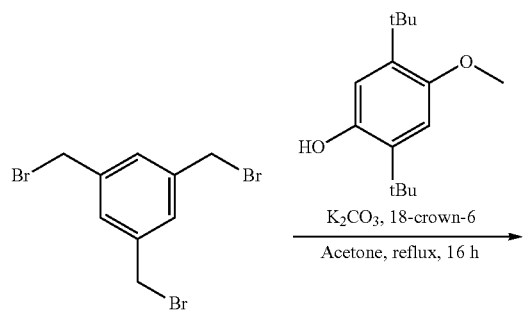

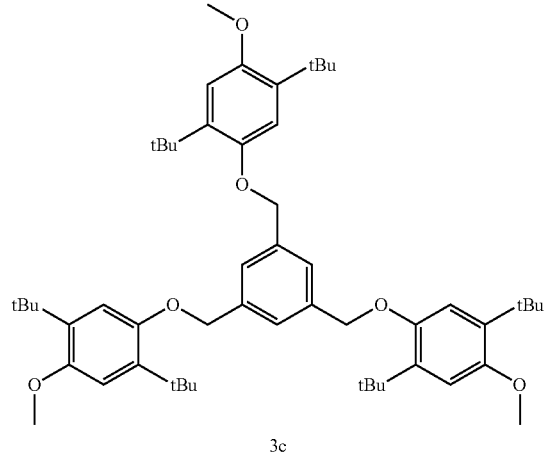

3c

Synthesis of DB3 Trimer (3c)

To a solution of 2,5-di-tert-butyl-4-methoxyphenol (7.80 g, 33 mmol), 1,3,5-tris(bromomethyl)benzene (3.57 g, 10 mmol), and 18-crown-6 (871 mg, 1.0 mmol) in acetone (50 mL) was added freshly pulverized, oven-dried potassium carbonate (6.83 g, 49.5 mmol) while stirring vigorously. The reaction mixture was heated at reflux for 16 h, cooled, and then the solids filtered; the solids were then washed with dichloromethane (3×50 mL). The filtrate was concentrated in vacuo. The crude product was dissolved in diethyl ether (150 mL), which was then extracted with aqueous sodium hydroxide (15% w/w) (3×50 mL), water (1×50 mL), and brine (1×50 mL). The ethereal layer was dried over magnesium sulfate, which was removed by filtration. After concentrating the ethereal layer in vacuo, the product was recrystallized from ethanol/dichloromethane to yield 3c as colorless needles (7.44 g, 90%). $^1$H NMR (500 MHz, CDCl$_3$) δ=7.52 (s, 3H), 6.89 (s, 3H), 6.85 (s, 3H), 5.10 (s, 6H), 3.81 (s, 9H), 1.37 (s, 27H), 1.32 (s, 27H) ppm; $^{13}$C{$^1$H} NMR (125 MHz, CDCl$_3$), δ=152.4, 151.3, 138.9, 136.8, 136.5, 125.8, 113.1, 111.9, 71.4, 56.1, 34.9, 34.8, 30.2, 30.0 ppm; HRMS (ESI): m/z for $C_{54}H_{78}O_6^+$ (M)$^+$ calculated 822.5793; found 822.5792; Anal. Calc'd for $C_{54}H_{78}O_6$: C, 78.79; H, 9.55; Found: C, 78.81; H, 9.60.

Synthesis of PIM-1

PIM-1 with molecular weight, $M_W$=386 kg mol$^{-1}$ ($M_N$=136 kg mol$^{-1}$, PDI=2.8) was synthesized as described elsewhere. Briefly, a mixture of anhydrous potassium carbonate (8.3 g, 60 mmol), 3,3,3',3'-tetramethyl-1,1'-spirobisindane-5,5',6,6'-tetrol (6.8 g, 20 mmol) and 2,3,5,6-tetrafluoroterephthalonitrile (4.0 g, 20 mmol) in dry DMF was stirred at 65° C. for 4 d. On cooling, the mixture was added to water and the crude product collected by filtration. Repeated precipitations from a concentrated solution of polymer in chloroform into methanol yielded 8.90 g (19.3 mmol, 97% yield) of the fluorescent yellow polymer (PIM-1).

Membrane Preparation

PIM-1 was dissolved in chloroform at a concentration of 12.5 mg mL$^{-1}$. PIM-1 membranes were cast by depositing 1 mL of solution into 3.5 cm diameter Teflon wells. The solvent was left to evaporate under an evaporation dish under ambient pressure for 5 h or until dryness. The films were further dried in vacuo overnight. Crosslinked PIM-1 membranes were prepared by adding 0.1 molar equivalents of 2,6-bis(4-azidobenzylidene)-cyclohexanone to the casting solution. Once dried, the crosslinked films were activated by heating in a vacuum oven at 175° C. for 7.5 h. The dried films were used as cast and Celgard® 2325 membranes were punched into 1 and 3/16 inch circles. All membranes were soaked in electrolyte overnight before use.

Computational Methods
Computational Methodology

Figure 5:
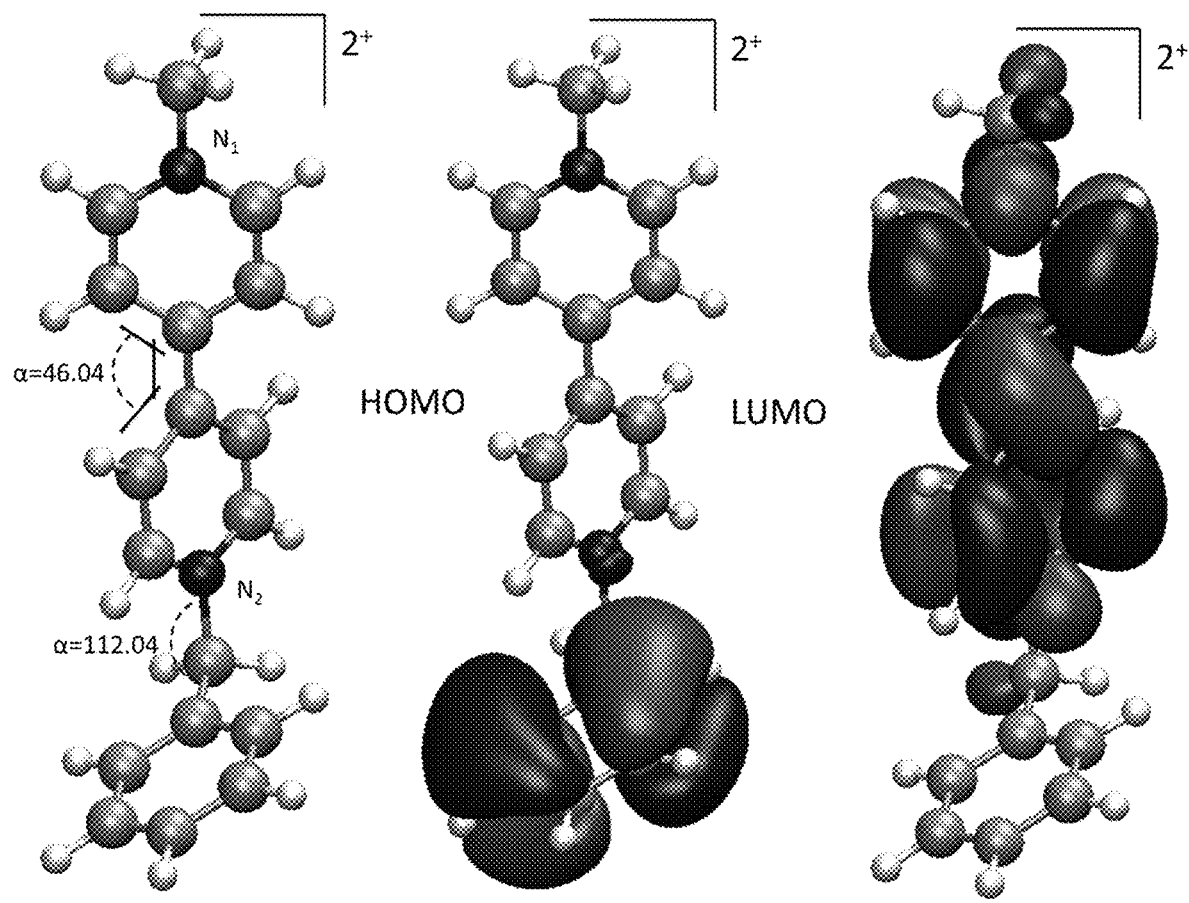
FIG. 5 illustrates a viologen monomer (1a) at 2+ state of charge and optimal configurations of its HOMO and LUMO orbitals.
Figure 6:
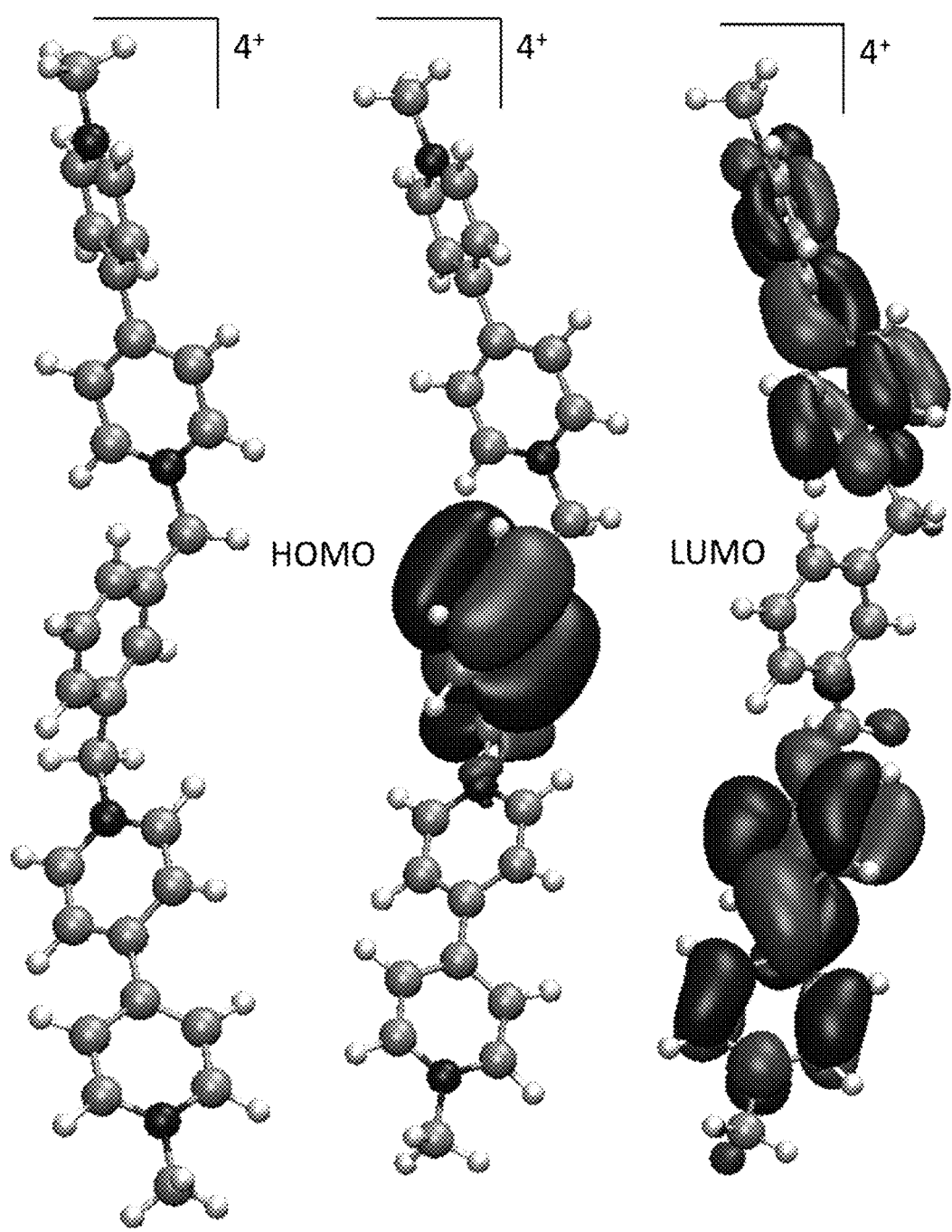
FIG. 6 illustrates a viologen dimer (2a) at 4+ state of charge and optimal configurations of its HOMO and LUMO orbitals.
Figure 7:
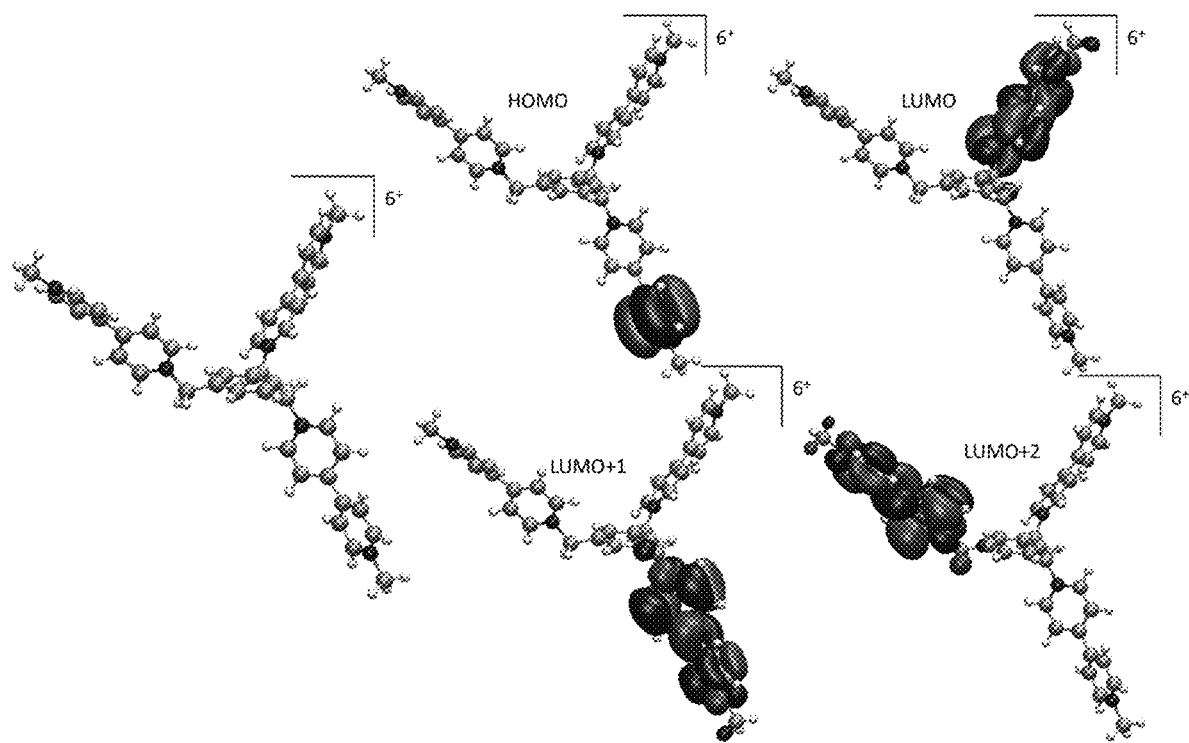
FIG. 7 illustrates a viologen trimer (3a) at 6+ state of charge and optimal configurations of its HOMO and LUMO orbitals. LUMO, LUMO$^{+1}$, and LUMO$^{+2}$ are nearly degenerate.
Figure 8:
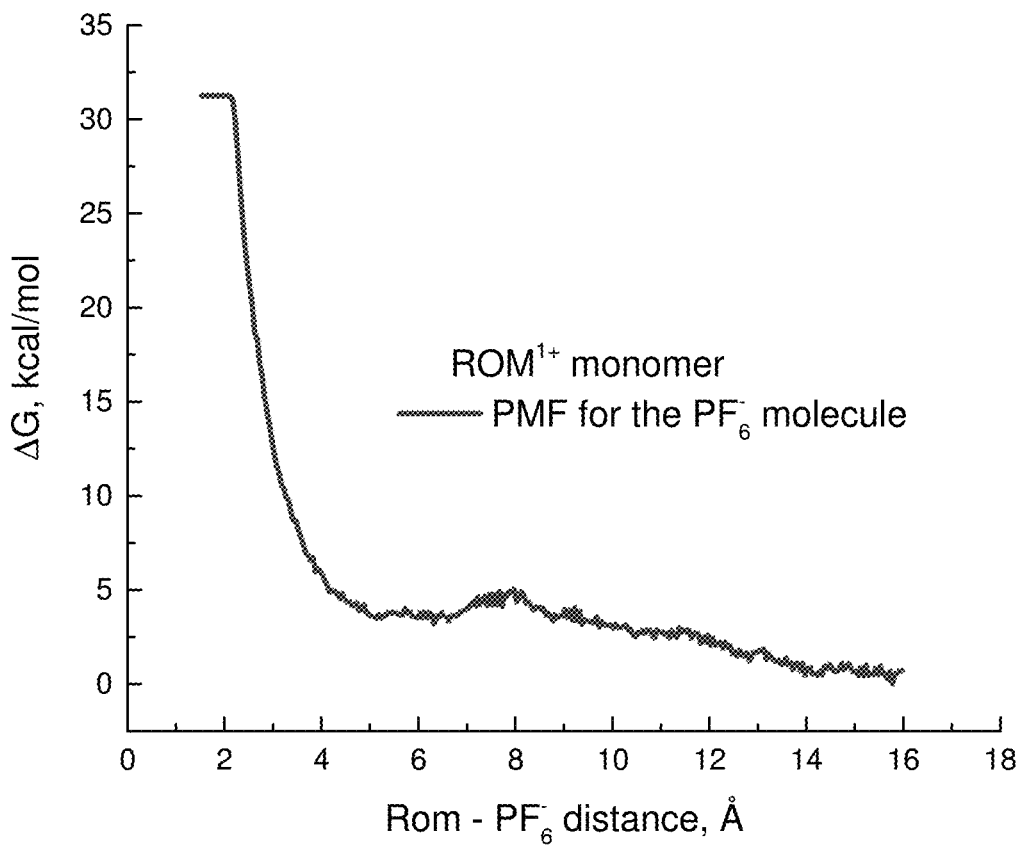
FIG. 8 illustrates a free energy profile for $1a^{1+}$. The collective variable is the distance between centers of masses of ROM and PF$_6^-$. $C_{ROM}$=0.1 M
Figure 9:
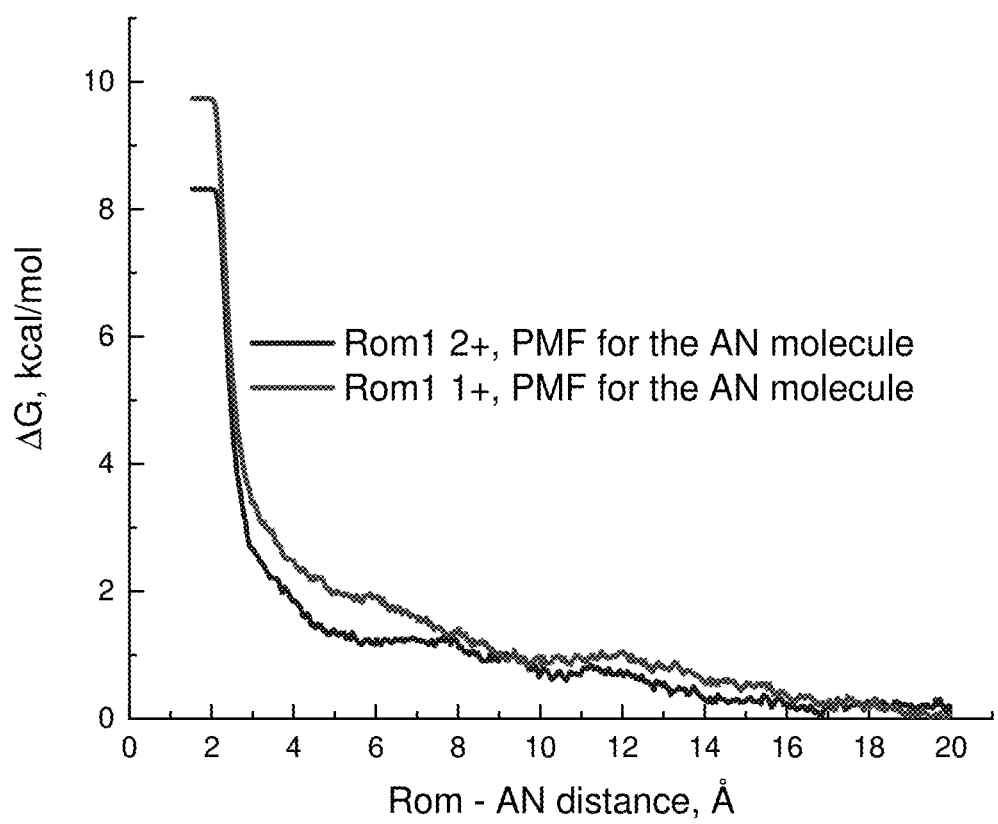
FIG. 9 illustrates a free energy profiles for $1a^{1+}$ $^{and}$ $1a^{2+}$. The collective variable is the distance between centers of masses of ROM and ACN. $C_{ROM}$=0.1 M

The systematic study of solvation structures of ROMs at different states of charges was performed in two steps. In the first step, the quantum mechanical study of small molecular clusters (isolated molecules) of ROMs (1a, 2a, 3a), ACN and $PF_6^-$ at T=0 K is carried out. First, we calculated the optimal molecular configurations of the ROMs with and without counter-ions and solvent (ACN) molecules. Next we evaluated charge distributions, and performed HOMO/LUMO orbital analysis (FIGS. 5-7). The effects of the finite temperature and condensed liquid phase on the ROMs solvation in ACN were accounted for by the use of classical MD. Generalized Amber force fields (GAFF) were used for solute and solvent molecules as well as for counter-ions. GAFF charges on nitrogen atoms underestimate the effects of the polarity of the ROM molecules. The comparison between the GAFF charge scheme and the charges obtained from ab initio is shown in Tables 1-2. In our simulations we used GAFF force field parameters in combination with Mulliken partial charges derived from ab initio calculations for the optimized geometry of ROMs. The free energy profiles were computed using the metadynamics technique. For the study of solvated structures of ROMs/ACN we calculated pair radial distribution functions (rdf) obtained with an algorithm adapted for non-spherical objects. Instead of taking the center of the mass of the ROM molecule as a reference point for rdf, the algorithm explicitly evaluates the distribution of distances from each atom of the ROM molecule to the solvent molecules (center of the mass of ACN or a particular atom in the solvent molecule, e.g., N) and averages them over the MD trajectory.

Quantum Chemistry Calculations

Optimized geometries, relative energies, and molecular orbitals were calculated with the DFT TeraChem package. As suggested in the previous extensive computational studies of aprotic ionic liquids, for ROMs/ACN systems in our calculations we used B3LYP5-D3 functional with the 6-311++G** basis set in combination with the third version of Grimme's empirical dispersion correction. We used the L-BFGS geometry optimization method with the termination criterion for the maximum energy gradient component of $4.5 \times 10^{-4}$ au. Wave function convergence threshold was set as $3.0 \times 10^{-5}$. Two-electron integral threshold was set as $1.0 \times 10^{-12}$, and the basis set linear dependency threshold was of $1.0 \times 10^{-4}$. Partial charges were computed using the full NBO and Mulliken analysis. For the open shell molecules unrestricted Kohn-Sham orbitals were computed.

Molecular Dynamics Calculations

Classical molecular dynamics (MD) simulations were conducted on the solutions (ROMs in ACN)—with $PF_6^-$ ions added accordingly to attain zero total charge using the LAMMPS simulation package. Long-range electrostatic interactions were treated within the particle-mesh Ewald (PME) method with a cutoff distance 1.0 nm with grid spacing in k-space of $10^{-5}$. A cut-off of 1.0 nm with a spline from 0.9 to 1.0 nm was used for Lennard-Jones interactions. The relaxation of the initial structures was performed in two steps, first using steepest descent with a convergence criterion of $10^{-4}$ kcal mol$^{-1}$ for energies and $10^{-4}$ kcal mol$^{-1}$ Å$^{-1}$ for forces. The systems were first heated to 298 K in the canonical ensemble (NVT). To remove any "memory" effects, the systems were first melted at 400 K and then annealed back to 298 K three times (with 2 ns each step). Then, isothermal-isobaric (NPT, P=1 atm, T=298 K) simulations were performed for 2 ns (2 fs time step) to obtain the correct density using a Nose/Hoover temperature thermostat and Nose/Hoover pressure barostat. Afterwards, the NVT simulations were performed (T=298 K) for 1 ns (2 fs time step) to equilibrate and sample the properties of interest. Structural properties were obtained from 10 ns MD simulation runs with an integration time step 1 fs in NVT ensemble. We ran several parallel simulations of solvated 1a, 2a and 3a at different concentrations. For 1a, $C_{ROM}$=0.03-0.1 M with a box size of 4×4×4 nm. For 2a, $C_{ROM}$=0.02-0.1 M with a box size of 6×6××6 nm. For 3a, $C_{ROM}$=0.01-0.05 M with a box size of 8×8×8 nm.

Crossover Measurements and Analysis

Figure 11:
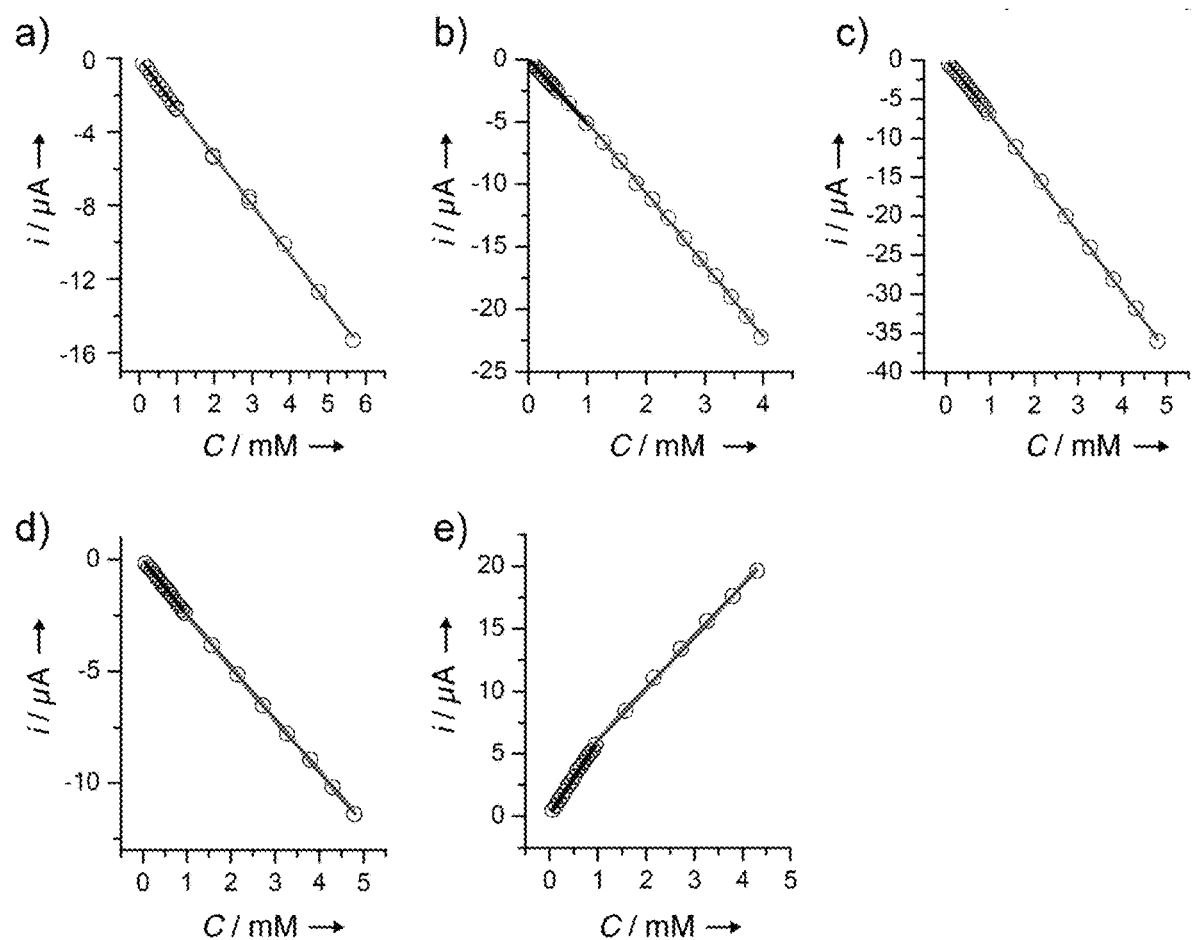
FIG. 11 illustrates calibration plots for a) viologen monomer (1a), b) viologen dimer (2a), c) viologen trimer (3a), d) acylpyridinium trimer (3b), and e) DB3 trimer (3c). The black and red lines correspond to the low and high concentration calibration regimes, respectively.
Figure 12:
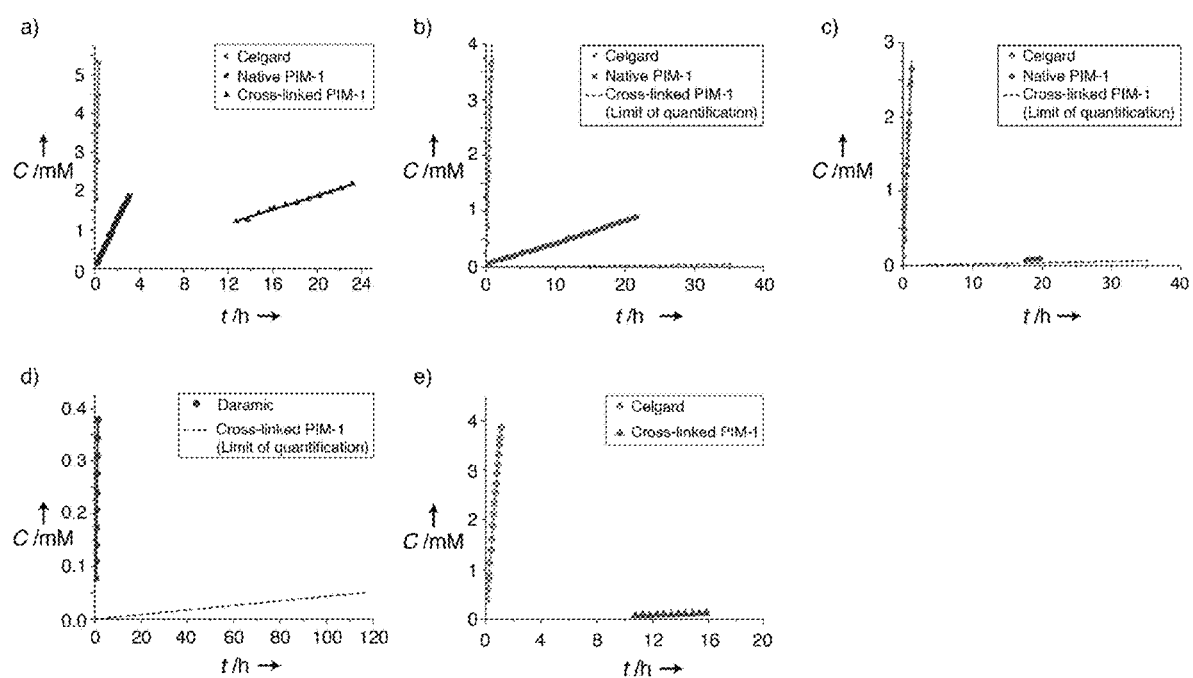
FIG. 12 illustrates measured concentration of ROM in the permeate compartment as a function of time (points) and linear fits (lines) for a) viologen monomer (1a), b) viologen dimer (2a), c) viologen trimer (3a), d) acylpyridinium trimer (3b), and e) DB3 trimer (3c). Circles represent Celgard (or Daramic for panel d), squares represent native PIM-1, and triangles represent cross-linked PIM-1 membranes. The dashed lines in panels b-d represent the maximum possible crossover rate for each molecule through cross-linked PIM-1 membranes, as none of these experiments surpassed the limit of quantification during the tested time.

A PIM-1 membrane of known thickness (typically 10 μm) was placed between two halves of an H-cell with an aperture diameter of 1.6 cm and sealed in place with a chemically resistant O-ring. One half of the H-cell (the retentate) was charged with 10 mL of 0.100 M ROM monomer (1a), 0.050 M dimer (2a), or 0.033 M trimer (3a, 3b, or 3c) in electrolyte, while the other half (the permeate) was charged with the same volume of electrolyte with no ROM (or RAO). For viologen-based ROM and RAOs (1a-3a), the salt concentration in the permeate was increased to 0.250, 0.225, and 0.215 M for the monomer, dimer, and trimer experiments, respectively, in order to minimize the initial osmotic pressure difference between the two compartments. Similarly, for acylpyridinium trimer 3b, the salt concentration in the permeate was increased to 0.166 M. Both compartments were stirred to ensure homogeneity. Every 5-60 min, the stirring was stopped and the concentration of ROM in the permeate was measured electrochemically by acquiring a CV at 100 mV s$^{-1}$ from −0.40 to −0.85 V (for 1a, 2a, and 3a), −1.00 to −1.70 V (for 3b), or 0.30 to 0.75 V (for 3c) vs. Ag/Ag$^+$. The peak cathodic (for 1a, 2a, 3a, and 3b) or anodic (for 3c) current was related to ROM concentration with a calibration curve (FIG. 11 and Table 3).

Calculation of $D_{eff}$ from Crossover Measurements

At any moment, the flux of active-species across the membrane (J, mol cm$^{-2}$ s$^{-1}$) can be described with Fick's first law:

$$J = D_{eff} \frac{\partial C}{\partial x} = D_{eff} \frac{C_{retentate}(t) - C_{permeate}(t)}{l}$$

Where C is the concentration in mol cm$^{-3}$ and l is the membrane thickness in cm. For short times, the difference $C_{retentate}(t) - C_{permeate}(t)$ does not change significantly from its initial value of $C_{retentate}(t_0) - C_{permeate}(t_0) = C_0$, and the flux is constant with time:

$$J_{t \sim 0} = D_{eff} \frac{C_0}{l}$$

The concentration of active species in the permeate compartment can be calculated by integrating the flux of active species and dividing by the volume of solution in the permeate compartment:

$$C_{permeate}(t) = \frac{A \int_0^t J(t)dt}{V_{permeate}} = \frac{D_{eff}C_0A}{lV_{permeate}}t$$

By measuring active-species concentration in the retentate compartment and plotting these values as a function of time, the effective diffusion coefficient of the active-species through the membrane can be quantified.

Limit of Quantification

As the salt concentration between the retentate and permeate equalizes, an osmotic pressure difference builds between the two compartments. This induces osmotic flow of solvent from the permeate into the retentate, thus rendering measurements after this time invalid due to competing convection and diffusion in opposite directions. In acetonitrile, this solvent movement was never observed for times <36 hours, so the lower limit of quantification for $D_{eff}$ is set by this time and the minimum quantifiable ROM concentration. In propylene carbonate, this solvent movement wasn't observed even after 1 week, so the lower limit of quantification for $D_{eff}$ is set by the duration of the experiment.

Calculation of $D_{sol}$ for viologen ROMs 1a-3a

The size and shape of viologen monomer (1a), dimer (2a), and trimer (3a) can be described by the smallest oblate spheroid that encompasses all of the atoms in each relaxed chemical structure. The predicted diffusion coefficient ($D_{sol}$) of these spheroids can be calculated using a modified form of the Stokes-Einstein equation that takes into account the non-spherical shape of these molecules, as well as the ratio between solute and solvent size:

$$D_{sol} = \frac{kT}{c(r_{solv}, r_H)f_s(a, b)\pi\eta r_H}$$

where $D_{sol}$ is the molecule's diffusion coefficient in solution in $m^2\ s^{-1}$, k is the Boltzmann constant, T is the temperature in K, $c(r_{solv}, r_H)$ is a correction factor for molecules that are similar in size to the solvent, $f_s(a,b)$ is a correction factor for non-spherical molecules, η is the solvent's viscosity in Poise, and $r_H$ is the molecule's hydrodynamic radius in m. For large, spherical molecules, the product $cf_s=6$, yielding the Stokes-Einstein equation.

Membrane Ionic Conductivity

Membranes with a diameter of 14 mm were soaked in electrolyte and sandwiched between two 12 mm diameter stainless steel electrodes in a Swagelok cell, with the excess membrane folded around one of the electrodes. Electrochemical impedance spectra were acquired on a Biologic VMP3 at a 0 V DC bias and 10 mV AC bias from 200 kHz to 1 kHz. The data were fitted to an equivalent circuit (Fig. S9) with the EC-Lab software by minimizing the fitting error, $\chi^2$ given by $$\chi^2 = \sum_i \frac{(z_{meas}(f_i) - z_{fit}(f_i))^2}{|z_{meas}(f_i)|}.$$

The equivalent circuit accounts for the resistance and inductance of the wiring connecting the potentiostat and the conductivity cell, which were measured to be 0.34Ω and $2.7 \times 10^{-6}$ H, respectively. All capacitors were modeled as constant phase elements, which have an impedance given by $Z(f)=[Q(j2\pi f)^\alpha]^{-1}$. When a is 0, the CPE acts as a perfect resistor, and when α is 1, it acts as a perfect capacitor. For intermediate values of α, the CPE acts as a "leaky capacitor." The membrane conductivity was calculated from the membrane resistance using the relation $\sigma = l(AR_M)^{-1}$, where σ is the membrane conductivity in S $cm^{-1}$, l is the membrane thickness in cm, A is the electrode area in $cm^2$, and $R_M$ is the membrane resistance in Ω.

TABLE 4

Calibration curve parameters and fitting errors for each viologen ROM

| Molecule | Slope (mA/mM) | Intercept (mM) | $R^2$ |
|---|---|---|---|
| Viologen-based ROM and RAOs | | | |
| 1a (low conc.) | $(-2.77 \pm 0.02) \times 10^{-3}$ | $(0 \pm 2) \times 10^{-5}$ | 0.9993 |
| 1a (high conc.) | $(-2.69 \pm 0.05) \times 10^{-3}$ | $(0 \pm 2) \times 10^{-4}$ | 0.9986 |
| 2a (low conc.) | $(-5.18 \pm 0.04) \times 10^{-3}$ | $(2 \pm 2) \times 10^{-5}$ | 0.9992 |
| 2a (high conc.) | $(-5.76 \pm 0.05) \times 10^{-3}$ | $(8 \pm 2) \times 10^{-4}$ | 0.9992 |
| 3a (low conc.) | $(-6.85 \pm 0.06) \times 10^{-3}$ | $(2 \pm 3) \times 10^{-5}$ | 0.9993 |
| 3a (high conc.) | $(-7.57 \pm 0.04) \times 10^{-3}$ | $(6 \pm 1) \times 10^{-4}$ | 0.9998 |
| Acylpyridinium-based RAOs | | | |
| 3b (low conc.) | $(-2.46 \pm 0.02) \times 10^{-3}$ | $(-1 \pm 1) \times 10^{-5}$ | 0.9994 |
| 3b (high conc.) | $(-2.34 \pm 0.01) \times 10^{-3}$ | $(-11 \pm 3) \times 10^{-5}$ | 0.9999 |
| DB3-based RAOs | | | |
| 3c (low conc.) | $(5.89 \pm 0.06) \times 10^{-3}$ | $(10 \pm 3) \times 10^{-5}$ | 0.9988 |
| 3c (high conc.) | $(4.14 \pm 0.05) \times 10^{-3}$ | $(20 \pm 2) \times 10^{-4}$ | 0.9991 |

TABLE 5

Measured values for $D_{eff}$ (in $cm^2\ s^{-1}$) for all membrane/ROM pairings.

| | Celgard | Native PIM-1 | Cross-linked PIM-1 |
|---|---|---|---|
| Viologen-based ROM and RAOs | | | |
| Monomer (1a) | $(5.4 \pm 0.4) \times 10^{-7}$ | $(1.3 \pm 0.1) \times 10^{-8}$ | $(1.1 \pm 0.1) \times 10^{-9}$ |
| Dimer (2a) | $(3.1 \pm 0.3) \times 10^{-7}$ | $(9 \pm 1) \times 10^{-10}$ | $3.4 \times 10^{-11}$ * |
| Trimer (3a) | $(2.2 \pm 0.2) \times 10^{-7}$ | $(2.1 \pm 0.3) \times 10^{-10}$ | $8.4 \times 10^{-11}$ * |
| Acylpyridinium-based RAOs | | | |
| Trimer (3b) | $(2.6 \pm 0.2) \times 10^{-7}$ † | — | $3.8 \times 10^{-11}$ * |

TABLE 5-continued

Measured values for $D_{eff}$ (in cm$^2$ s$^{-1}$) for all membrane/ROM pairings.

| | Celgard | Native PIM-1 | Cross-linked PIM-1 |
|---|---|---|---|
| DB3-based RAOs | | | |
| Trimer (3c) | $(3.7 \pm 0.3) \times 10^{-7}$ | — | $(8.1 \pm 0.7) \times 10^{-10}$ |

\* indicates that $D_{eff}$ was below the limit of quantification, so the reported value is an upper-bound for $D_{eff}$.
† indicates that the measurement was performed with Daramic instead of Celgard due to poor wetting of Celgard with propylene carbonate.

TABLE 6

Dimensions and volume of the oblate spheroids that encompass the calculated structures of 1a, 2a, and 3a, along with the calculated Stokes-Einstein (assuming spherical shape and small solvent size) and modified Stokes-Einstein (using the known shape and solvent size) diffusion coefficients in acetonitrile.

| Species | a axis (Å) | c axis (Å) | Volume (Å$^3$) | Stokes-Einstein $D_{sol}$ (cm$^2$ s$^{-1}$) | Modified Stokes-Einstein $D_{sol}$ (cm$^2$ s$^{-1}$) |
|---|---|---|---|---|---|
| Monomer (1a) | 3.75 | 6 | 353.4 | $1.5 \times 10^{-5}$ | $1.6 \times 10^{-5}$ |
| Dimer (2a) | 4.38 | 12.25 | 984.4 | $1.0 \times 10^{-5}$ | $1.0 \times 10^{-5}$ |
| Trimer (3a) | 12.25 | 3.94 | 2476.6 | $7.6 \times 10^{-6}$ | $7.1 \times 10^{-5}$ |

TABLE 7

Fitting parameters for EIS spectra

| Membrane | Membrane Thickness (μm) | $Q_{DL}$ (Fs$^{\alpha-1}$) [α] | $Q_M$ (Fs$^{\alpha-1}$) [α] | $R_M$ (Ω) | σ (mS cm$^{-1}$) |
|---|---|---|---|---|---|
| Celgard (3x) | 75 | $11.9 \times 10^{-6}$ [0.94] | $35.5 \times 10^{-9}$ [1.00] | 3.086 | 2.15 |
| Cross-linked PIM-1 (3x) | 29 | $13.3 \times 10^{-6}$ [0.93] | $10.5 \times 10^{-9}$ [1.00] | 6.371 | 0.40 |

Figure 16:
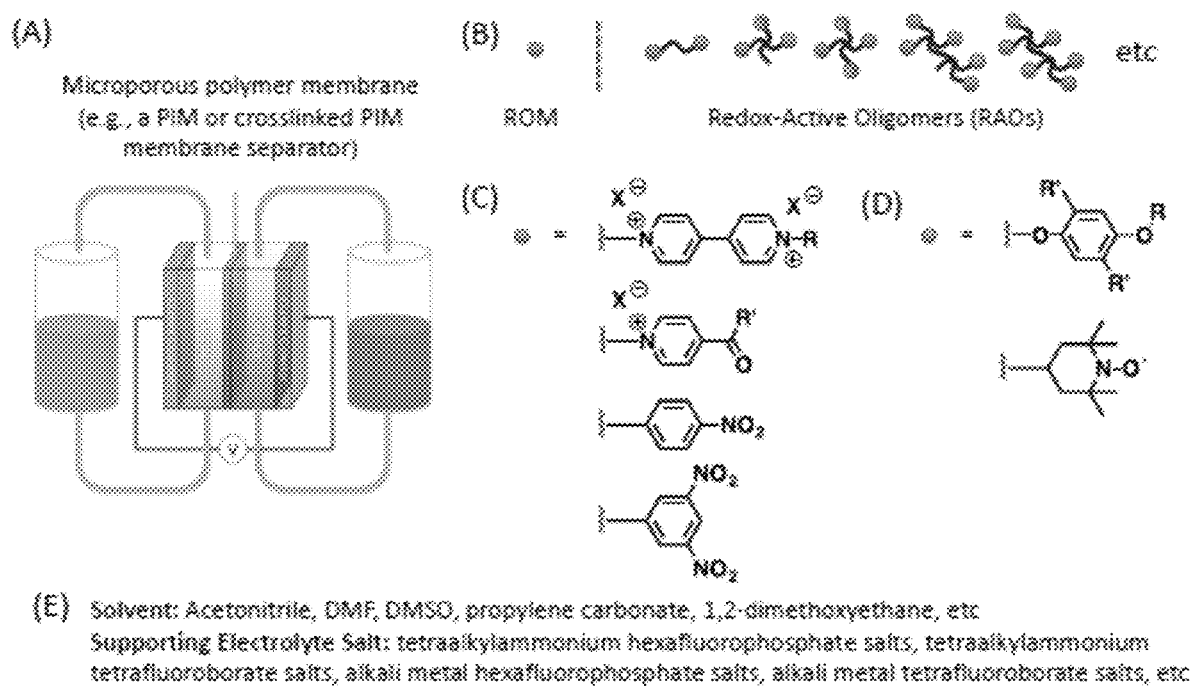
FIG. 16 illustrates a representative flow-cell schematic for redox-flow batteries employing oligomeric organic active materials (RAOs) and size-selective microporous polymer membranes (panel A). Panel (B) illustrates a schematic representation of ROM oligomerization into RAOs. Panel (C) illustrates representative oligomeric organic negative electrode materials. Panel (D) illustrates representative oligomeric organic positive electrode materials. Panel (E) illustrates representative electrolyte formulations.

FIG. 16 illustrates a representative flow-cell schematic for redox-flow batteries employing oligomeric organic active materials (RAOs) and size-selective microporous polymer membranes. (Panel B) Schematic representation of ROM oligomerization into RAOs. Panel (C) illustrates representative oligomeric organic negative electrode materials. Panel (D) illustrates representative oligomeric organic positive electrode materials. Panel (E) illustrates representative electrolyte formulations.

In various embodiments, charge is stored by oligomeric redox active organic molecules dissolved in an electrolyte (referred to as anolyte or catholyte, depending on the identity of the molecules). During the operation of the energy storage device, catholyte and anolyte solutions are flowed past (or through) current collectors that serve as the positive and negative electrode, respectively. As the battery is discharged or charged, the redox active oligomers change oxidation state, and counter-ions flow through a selective membrane to complete the circuit.

The selective membrane in various embodiments consists of size-selective porous polymer membranes with pores small enough to block crossover of the oligomeric active material while still allowing transport of supporting ions in the electrolyte. Various embodiments are characterized by the use of both: 1) Redox-active oligomeric organic molecules and 2) size-selective membranes that block the crossover of (1) and allow the movement of supporting ions in solution.

By combining redox-active oligomers with size-selective membranes, we were able to solve a number of outstanding problems in the field of energy storage. Most redox-flow batteries are plagued by the crossover of active materials. This crossover leads to decreased cell efficiency and cycle life. Previous attempts by others in the field to block the crossover of active-species often led to decreased membrane ionic conductivity, which reduces the rate capability of the cell.

In another strategy for blocking active-species crossover, the use of large, polymeric charge storage molecules results in improved crossover performance without sacrificing ionic conductivity, but at the cost of increased solution viscosity and decreased electron transfer kinetics. This increases the pumping losses in redox-flow batteries.

However, various embodiments provide the best of both approaches while circumventing their limitations: 1) By using small (relative to polymers) molecules, the solution viscosity and electron transfer kinetics can be kept low and fast, respectively; 2) By pairing redox-active oligomers with size-selective membranes, the crossover of active-species can be greatly reduced without dramatically sacrificing ionic conductivity. Thus, various embodiments allow for energy storage devices with longer cycle life, higher efficiency, and better rate capability.

A number of technical challenges were overcome while developing this invention. First, the design and synthesis of suitable redox-active oligomeric molecules presented a challenge. Not all redox-active oligomeric molecules exhibit reversible electrochemistry and long-term stability in all oxidation states, so we worked to find several examples of molecules that fit the requirements of energy storage devices. Second, we overcame a number of challenges related to the preparation and modification of membrane materials. By incorporating crosslinking and other post-synthetic modifications, we were able to tune the pore-size of the selective membranes in order to control their active-species blocking and ion transport ability.

All-Organic redox-flow batteries are well positioned to offer low-cost, multi-hour electrochemical energy storage at large scale in line with targets for grid modernization. During flow-battery operation, solutions of redox-active organic molecules (ROMs) in electrolyte are circulated through the negative and positive electrode compartments of an electrochemical cell. These compartments are electronically isolated from each other by an ion-transporting membrane separator. In order to maximize cycle-life and efficiency, it is imperative to block ROMs from migrating between electrode compartments during cycling while also maintaining facile transport of the working ion. In working on this subject matter, we were hoping to develop active-materials and membranes that, when paired together, would result in decreased active-material crossover with minimal impact to cell kinetics or membrane conductivity.

Breaking with convention, the advances reported here provide an important counterpoint to: 1) single-component electrodes paired with ceramic membranes, which are expensive and difficult to scale; 2) thick macroporous separators paired with mixed-electrode formulations (i.e., anolytes and catholytes present in both electrode compartments), which lead to coulombic and voltage inefficiencies; and 3) mesoporous separators paired with redoxactive polymers (RAPs), which can be difficult to pump through electrochemical cells at high molecular weight and at all states-of-charge. Our strategy to implement ROM oligomerization, as opposed to polymerization, should also serve to retain facile charge transfer kinetics otherwise characteristic of ROM monomers, which are essential for power quality and high active-material utilization.

Various embodiments are expected to have applications in multi-hour power delivery as befits such a device for grid-scale energy storage. In addition, various embodiments could find use for renewable energy storage in residential, commercial, and industrial buildings. Various embodiments could also be useful for backup/redundant power for critical infrastructure or for use in locations with poor grid reliability. With respect to the latter, it can be used as the energy storage device for nano and microgrids, powering off-grid communities, isolated island communities, construction sites, mines, etc.

Various embodiments describe a redox flow cell comprising at least one redox active organic molecule (ROM) or redox active oligomer (RAO), an electrolyte, and a microporous membrane.

A redox flow cell wherein the undiluted RAO is a liquid.

A redox flow cell wherein the undiluted RAO is an ionic compound.

A redox flow cell wherein the RAO is a monodisperse chemical compound comprising at least two redox active organic molecules, chosen from nitroxide radicals, nitronylnitroxide radicals, thiazyl radicals, thiafulvalenes, thioethers, thiolanes, thiophenes, viologens, tetraketopiperazines, quinoxalines, triarylamines, diarylalkylamines, quinones, anthraquinones, metallocenes, carbazoles, N-alkylated 4-acylpyridiniums, N-alkylated 4-benzoylpyridiniums, 1,4-dialkoxyl-2,5-dialkylbenzenes, 1,2,3-(dialkylamino)cyclopropeniums, benzofurazans, benzothiadiazoles, nitrobenzenes, and isomers and derivatives thereof; and a chemical scaffold to which the redox active organic molecules are covalently bound, chosen from aliphatic hydrocarbons, cyclic aliphatic hydrocarbons, aromatic hydrocarbons, polycyclic aromatic hydrocarbons, alkylene glycols, alkylene imines, quaternary alkylene iminiums, aliphatic esters, aromatic esters, aliphatic ethers, aromatic ethers, aliphatic thioethers, aromatic thioethers, aliphatic amides, aromatic amides, aliphatic sulfones, aromatic sulfones, and combinations and derivatives thereof.

A redox flow cell wherein the RAO is a polydisperse chemical compound comprising at least two redox active organic molecules, chosen from nitroxide radicals, nitronylnitroxide radicals, thiazyl radicals, thiafulvalenes, thioethers, thiolanes, thiophenes, viologens, tetraketopiperazines, quinoxalines, triarylamines, diarylalkylamines, quinones, anthraquinones, metallocenes, carbazoles, N-alkylated 4-acylpyridiniums, N-alkylated 4-benzoylpyridiniums, 1,4-dialkoxyl-2,5-dialkylbenzenes, 1,2,3-(dialkylamino)cyclopropeniums, benzofurazans, benzothiadiazoles, nitrobenzenes, and isomers and derivatives thereof; and a chemical scaffold to which the redox active organic molecules are covalently bound, chosen from aliphatic hydrocarbons, cyclic aliphatic hydrocarbons, aromatic hydrocarbons, polycyclic aromatic hydrocarbons, alkylene glycols, alkylene imines, quaternary alkylene iminiums, aliphatic esters, aromatic esters, aliphatic ethers, aromatic ethers, aliphatic thioethers, aromatic thioethers, aliphatic amides, aromatic amides, aliphatic sulfones, aromatic sulfones, and combinations and derivatives thereof.

A chemical scaffold to which the redox active organic molecules are covalently bound to form a RAO, is linear.

A chemical scaffold to which the redox active organic molecules are covalently bound to form a RAO, is branched.

A chemical scaffold to which the redox active organic molecules are covalently bound to form a RAO, is cyclic.

A redox flow cell wherein the ROM or RAO is an ionic compound and used undiluted, or as a solution, dispersion, or suspension in water or an organic solvent.

A redox flow cell wherein the ROM or RAO is used as a solution, dispersion, or suspension in an aqueous or an organic electrolyte.

A redox flow cell wherein the electrolyte is an aqueous or organic solution containing at least one dissolved salt.

A redox flow cell wherein the microporous membrane comprises: a polymer of intrinsic microporosity (PIM), a thermally-rearranged polymer (TR polymer), a metal-organic framework (MOF), a covalent organic framework (COF), a carbon molecular sieve (CMS), a porous coordination polymer (PCP), a microporous 2-dimensional material or atomic layer, or few-layer stacks of one or more types of microporous 2-dimensional materials or atomic layers.

A redox flow cell wherein the microporous membrane is chemically crosslinked.

A redox flow cell wherein the microporous membrane comprises a composite containing at least one of the following: a polymer of intrinsic microporosity (PIM), a thermally-rearranged polymer (TR polymer), a metal-organic framework (MOF), a covalent organic framework (COF), a carbon molecular sieve (CMS), a porous coordination polymer (PCP), a microporous 2-dimensional material or atomic layer, or few-layer stacks of one or more types of microporous 2-dimensional materials or atomic layers.

A redox flow cell wherein the microporous membrane is an unsupported membrane (5 to 500 microns in thickness).

A redox flow cell wherein the microporous membrane is a supported microporous selective layer (0.5 to 500 microns in thickness) comprised of: a selective layer, chosen from a polymer of intrinsic microporosity (PIM), a thermally-rearranged polymer (TR polymer), a metal-organic framework (MOF), a covalent organic framework (COF), a carbon molecular sieve (CMS), a porous coordination polymer (PCP), a microporous 2-dimensional material or atomic layer, or few-layer stacks of one or more types of microporous 2-dimensional materials or atomic layers; or, a chemically crosslinked selective layer incorporating a polymer of intrinsic microporosity (PIM), a thermally-rearranged polymer (TR polymer), a metal-organic framework (MOF), a covalent organic framework (COF), a carbon molecular sieve (CMS), a porous coordination polymer (PCP), a microporous 2-dimensional material or atomic layer, or few-layer stacks of one or more types of microporous 2-dimensional materials or atomic layers; or, a composite selective layer, incorporating at least one polymer of intrinsic microporosity (PIM), thermally-rearranged polymer (TR polymer), metal-organic framework (MOF), covalent organic framework (COF), carbon molecular sieve (CMS), porous coordination polymer (PCP), microporous 2-dimensional material or atomic layer, or few-layer stacks of one or more types of microporous 2-dimensional materials or atomic layers; and where the support is either a porous organic or porous inorganic support; and where the support is coated on a single side or on both sides with the same selective layer or with two different selective layers of the same thickness or of different thickness (0.5 to 500 microns in thickness).

A redox flow cell wherein the microporous membrane reduces the diffusive permeability and rate of crossover of the ROM or RAO between the electrode compartments in the redox flow cell.

A redox flow cell wherein the microporous membrane blocks the diffusive permeability and crossover of the ROM or RAO between the electrode compartments in the redox flow cell.

What is claimed is:

1. A redox flow cell comprising:
   at least one redox active oligomer (RAO) comprising: at least two redox active organic molecules, chosen from nitroxide radicals, nitronylnitroxide radicals, thiazyl radicals, thiafulvalenes, thioethers, thiolanes, thiophenes, viologens, tetraketopiperazines, quinoxalines, triarylamines, diarylalkylamines, quinones, anthraquinones, metallocenes, carbazoles, N-alkylated 4-acylpyridiniums, N-alkylated 4-benzoylpyridiniums, 1,4-dialkoxyl-2,5-dialkylbenzenes, 1,2,3-(dialkylamino)cyclopropeniums, benzofurazans, benzothiadiazoles, nitrobenzenes, and isomers and derivatives thereof; and a chemical scaffold to which the redox active organic molecules are covalently bound, chosen from aliphatic hydrocarbons, cyclic aliphatic hydrocarbons, aromatic hydrocarbons, polycyclic aromatic hydrocarbons, alkylene glycols, alkylene imines, quaternary alkylene iminiums, aliphatic esters, aromatic esters, aliphatic ethers, aromatic ethers, aliphatic thioethers, aromatic thioethers, aliphatic amides, aromatic amides, aliphatic sulfones, aromatic sulfones, and combinations and derivatives thereof; wherein the RAO comprises one structure selected from the group consisting of

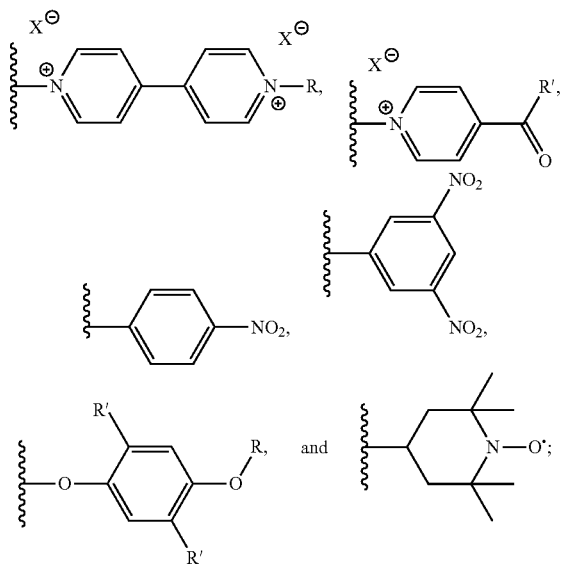

an electrolyte; and
a microporous membrane having a thickness of from 5 to 500 microns comprising: a polymer of intrinsic microporosity (PIM) crosslinked with a crosslinking agent having a pore size less than 1.2 nm.

2. The redox flow cell of claim 1 wherein the undiluted RAO is a liquid.

3. The redox flow cell of claim 1 wherein the undiluted RAO is an ionic compound.

4. The redox flow cell of claim 1 wherein the RAO is a N-ethyl-4,4'-bipyridinium hexafluorophosphate, viologen dimer, viologen trimer, acylpyridinium trimer, or

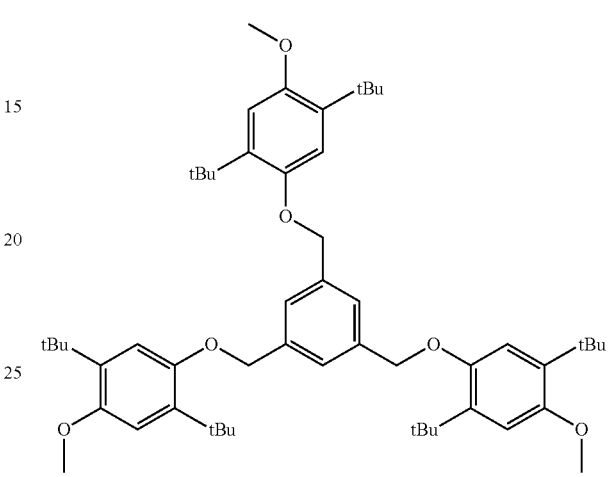

(DB3 trimer).

5. The redox flow cell of claim 1 wherein the RAO is a polydisperse chemical compound comprising: at least two redox active organic molecules, chosen from nitroxide radicals, nitronylnitroxide radicals, thiazyl radicals, thiafulvalenes, thioethers, thiolanes, thiophenes, viologens, tetraketopiperazines, quinoxalines, triarylamines, diarylalkylamines, quinones, anthraquinones, metallocenes, carbazoles, N-alkylated 4-acylpyridiniums, N-alkylated 4-benzoylpyridiniums, 1,4-dialkoxyl-2,5-dialkylbenzenes, 1,2,3-(dialkylamino)cyclopropeniums, benzofurazans, benzothiadiazoles, nitrobenzenes, and isomers and derivatives thereof; and a chemical scaffold to which the redox active organic molecules are covalently bound, chosen from aliphatic hydrocarbons, cyclic aliphatic hydrocarbons, aromatic hydrocarbons, polycyclic aromatic hydrocarbons, alkylene glycols, alkylene imines, quaternary alkylene iminiums, aliphatic esters, aromatic esters, aliphatic ethers, aromatic ethers, aliphatic thioethers, aromatic thioethers, aliphatic amides, aromatic amides, aliphatic sulfones, aromatic sulfones, and combinations and derivatives thereof.

6. The chemical scaffold in claim 4 or claim 5, to which the redox active organic molecules are covalently bound to form a RAO, is linear.

7. The chemical scaffold in claim 4 or claim 5, to which the redox active organic molecules are covalently bound to form a RAO, is branched.

8. The redox flow cell of claim 4 or claim 5, to which the redox active organic molecules are covalently bound to form a RAO, is cyclic.

9. The redox flow cell of claim 1 wherein the RAO is an ionic compound and used undiluted, or as a solution, dispersion, or suspension in water or an organic solvent.

10. The redox flow cell of claim 1 wherein the RAO is used as a solution, dispersion, or suspension in an aqueous or an organic electrolyte.

11. The redox flow cell of claim 1 wherein the electrolyte is an aqueous or organic solution containing at least one dissolved salt.

12. The redox flow cell of claim 1 wherein the microporous membrane comprises a polymer of intrinsic microporosity (PIM) having a pore size less than 1.2 nm.

13. The redox flow cell of claim 1 wherein the microporous membrane is an unsupported membrane (5 to 500 microns in thickness).

14. The redox flow cell of claim 1 comprising a porous organic or inorganic support coated on a single side or on both sides with the microporous membrane.

15. The redox flow cell of claim 1 wherein the microporous membrane reduces the diffusive permeability and rate of crossover of the RAO between the electrode compartments in the redox flow cell.

16. The redox flow cell of claim 1 wherein the microporous membrane blocks the diffusive permeability and crossover of the RAO between the electrode compartments in the redox flow cell.

17. The redox flow cell of claim 1, wherein the microporous membrane has a pore size of less than 1 nm.

18. The redox flow cell of claim 1 wherein the polymer of intrinsic microporosity (PIM) crosslinked with a 0.1 molar equivalent of the crosslinking agent.

19. The redox flow cell of claim 18 wherein crosslinking agent comprises an azide group which has been converted into a reactive nitrene and is inserted into the a C—H bond of the polymer.

20. The redox flow cell of claim 19 wherein crosslinking agent is 2,6-bis(4-azidobenzylidene)-cyclohexanone.

21. The redox flow cell of claim 1 wherein the RAO has a molecular dimension of at least 8.8 Å.

22. The redox flow cell of claim 21 wherein the RAO has a molecular dimension of from 8.8 Å to 16.8 Å.

23. The redox flow cell of claim 21 wherein the RAO has a molecular dimension of at least 12.3 Å.

24. The redox flow cell of claim 23 wherein the RAO has a molecular dimension of from 12.3 Å to 16.8 Å.

* * * * *